United States Patent
Yanai et al.

(10) Patent No.: US 9,769,352 B2
(45) Date of Patent: Sep. 19, 2017

(54) IMAGE PROCESSING APPARATUS AND METHOD FOR DETECTING UNIQUE PORTIONS PERIODICALLY DISTRIBUTED IN A PRINTED IMAGE

(71) Applicant: CANON KABUSHIKI KAISHA, Tokyo (JP)

(72) Inventors: Yumi Yanai, Yokohama (JP); Shinjiro Hori, Yokohama (JP); Tetsuya Suwa, Yokohama (JP); Hidetsugu Kagawa, Kawasaki (JP); Tomokazu Ishikawa, Yokohama (JP); Wakako Tanaka, Inagi (JP); Tohru Ikeda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/189,319

(22) Filed: Jun. 22, 2016

(65) Prior Publication Data

US 2017/0006185 A1     Jan. 5, 2017

(30) Foreign Application Priority Data

Jul. 1, 2015    (JP) .................................. 2015-132733

(51) Int. Cl.
*H04N 1/00*     (2006.01)
*H04N 1/40*     (2006.01)
(Continued)

(52) U.S. Cl.
CPC ................. *H04N 1/40* (2013.01); *G06T 7/11* (2017.01); *H04N 1/00015* (2013.01);
(Continued)

(58) Field of Classification Search
None
See application file for complete search history.

(56) References Cited

U.S. PATENT DOCUMENTS 6,608,926 B1    8/2003    Suwa et al.
6,694,051 B1    2/2004    Yamazoe et al.
(Continued)

FOREIGN PATENT DOCUMENTS

EP     1 814 302 A2    8/2007
JP     2013-185862 A    9/2013

OTHER PUBLICATIONS

Aoki et al., "'KIZUKI' Processing for Visual Inspection a Smart Pattern Pop-out Algorithm based on Human Visual Architecture," 22nd International Conference on Pattern Recognition, 2014, pp. 2317-2322, Japan.

(Continued)

*Primary Examiner* — Scott A Rogers
(74) *Attorney, Agent, or Firm* — Fitzpatrick, Cella, Harper & Scinto

(57) ABSTRACT

An image processing apparatus for performing a process of detecting a unique portion that occurs periodically in an inspection target image, includes: a dividing unit for dividing a part area of the inspection target image into a plurality of division areas; an averaging unit for changing a phase of the plurality of division areas in the part area and averaging pixel values in each of the plurality of division areas in each of changed phases; an addition unit for adding averaged values in each of the plurality of division areas in each of changed phases; and a setting unit for, with respect to a period $\lambda$ with which the unique portion of a detection target appears, setting a size S of each of the plurality of division areas in a direction in which the unique portion may appear with the period $\lambda$, so as to meet $S<\lambda$.

18 Claims, 23 Drawing Sheets

(51) Int. Cl.
  *H04N 1/409* (2006.01)
  *G06T 7/11* (2017.01)
  G06K 15/10 (2006.01)
  B41J 2/01 (2006.01)
  B41J 2/21 (2006.01)
  H04N 1/401 (2006.01)

(52) U.S. Cl.
  CPC ......... *H04N 1/00037* (2013.01); *H04N 1/409* (2013.01); *B41J 2/01* (2013.01); *B41J 2/2142* (2013.01); *G06K 15/102* (2013.01); *G06T 2207/20216* (2013.01); *G06T 2207/30168* (2013.01); *H04N 1/4015* (2013.01)

(56) References Cited

U.S. PATENT DOCUMENTS

| | | | |
|---|---|---|---|
| 7,432,985 B2 | 10/2008 | Ishikawa et al. | |
| 7,616,823 B2 | 11/2009 | Ishikawa | |
| 7,924,469 B2 | 4/2011 | Ono et al. | |
| 7,944,588 B2 | 5/2011 | Yamada et al. | |
| 8,008,562 B2 | 8/2011 | Ikeda et al. | |
| 8,175,155 B2 | 5/2012 | Suwa et al. | |
| 8,237,991 B2 | 8/2012 | Ono et al. | |
| 8,405,876 B2 | 3/2013 | Nakatani et al. | |
| 8,472,076 B2 | 6/2013 | Ikeda | |
| 8,620,105 B2 | 12/2013 | Hori et al. | |
| 9,052,742 B2 | 6/2015 | Hori et al. | |
| 9,088,753 B2 | 7/2015 | Akiba et al. | |
| 9,135,523 B2 | 9/2015 | Kato et al. | |
| 9,189,681 B2 | 11/2015 | Kunieda et al. | |
| 9,232,109 B2 | 1/2016 | Suwa et al. | |
| 9,275,270 B2 | 3/2016 | Suwa et al. | |
| 9,386,186 B2 | 7/2016 | Mochizuki et al. | |
| 9,623,670 B2 * | 4/2017 | Kagawa | B41J 2/2142 |
| 2011/0299099 A1 | 12/2011 | Xu et al. | |
| 2012/0268759 A1 | 10/2012 | Ono et al. | |
| 2015/0243000 A1 | 8/2015 | Hori et al. | |
| 2016/0292526 A1 * | 10/2016 | Ukishima | G06K 9/03 |
| 2017/0001432 A1 * | 1/2017 | Ishikawa | B41J 2/16579 |
| 2017/0004360 A1 * | 1/2017 | Tanaka | G06K 9/00442 |
| 2017/0004375 A1 * | 1/2017 | Ikeda | G06K 9/46 |
| 2017/0004376 A1 * | 1/2017 | Hori | G06K 9/46 |
| 2017/0004614 A1 * | 1/2017 | Suwa | G06T 7/0004 |
| 2017/0066268 A1 * | 3/2017 | Kyoso | B41J 2/155 |

OTHER PUBLICATIONS

Extended European Search Report dated Nov. 15, 2016, in European Patent Application No. 16001434.6.

Kimiya Aoki et al., "'KIZUKI' Algorithm inspired by Peripheral Vision and Involuntary Eye Movement", Journal of the Japan Society for Precision Engineering, 2013, pp. 1045-1049, vol. 79, No. 11, Japan.

\* cited by examiner

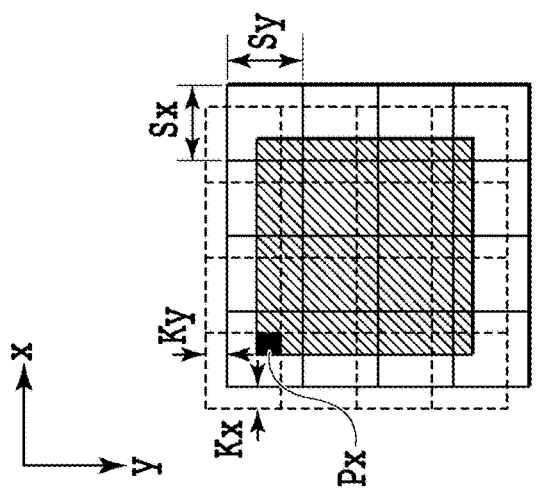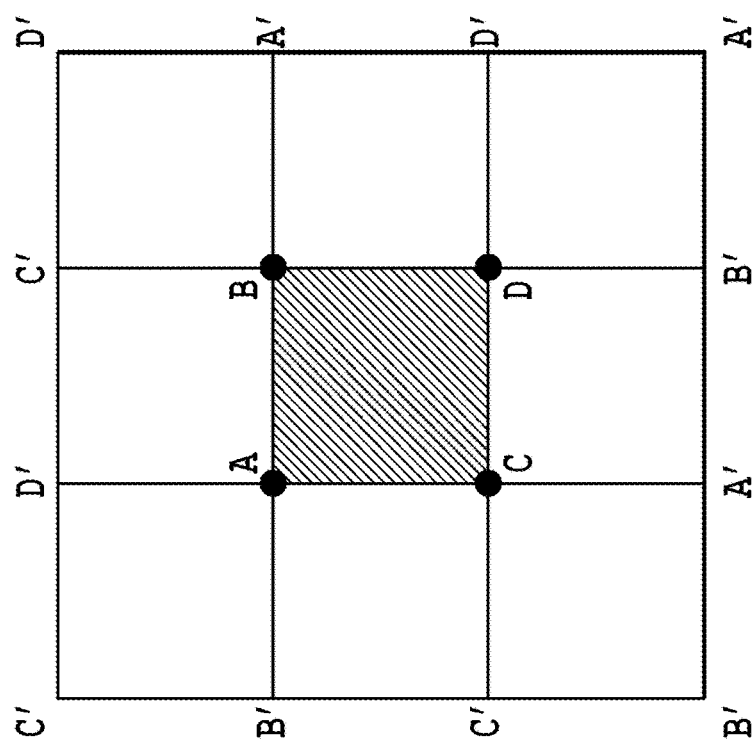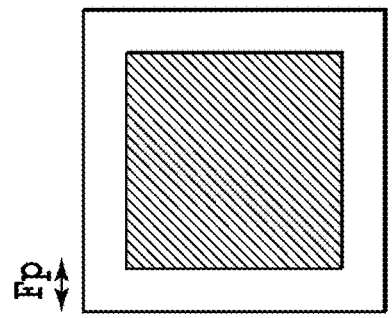

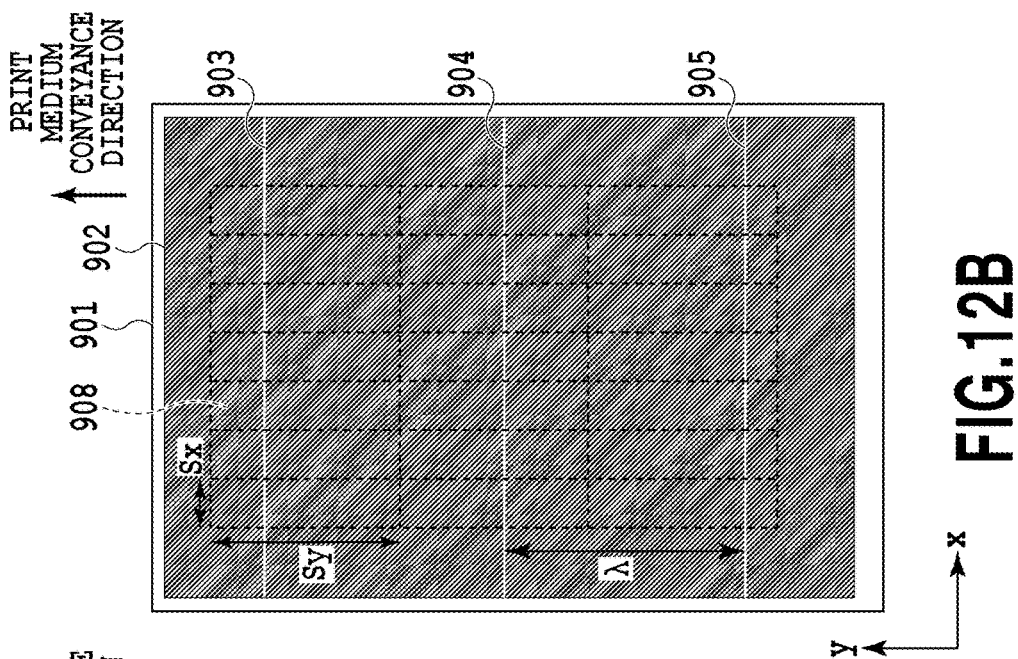
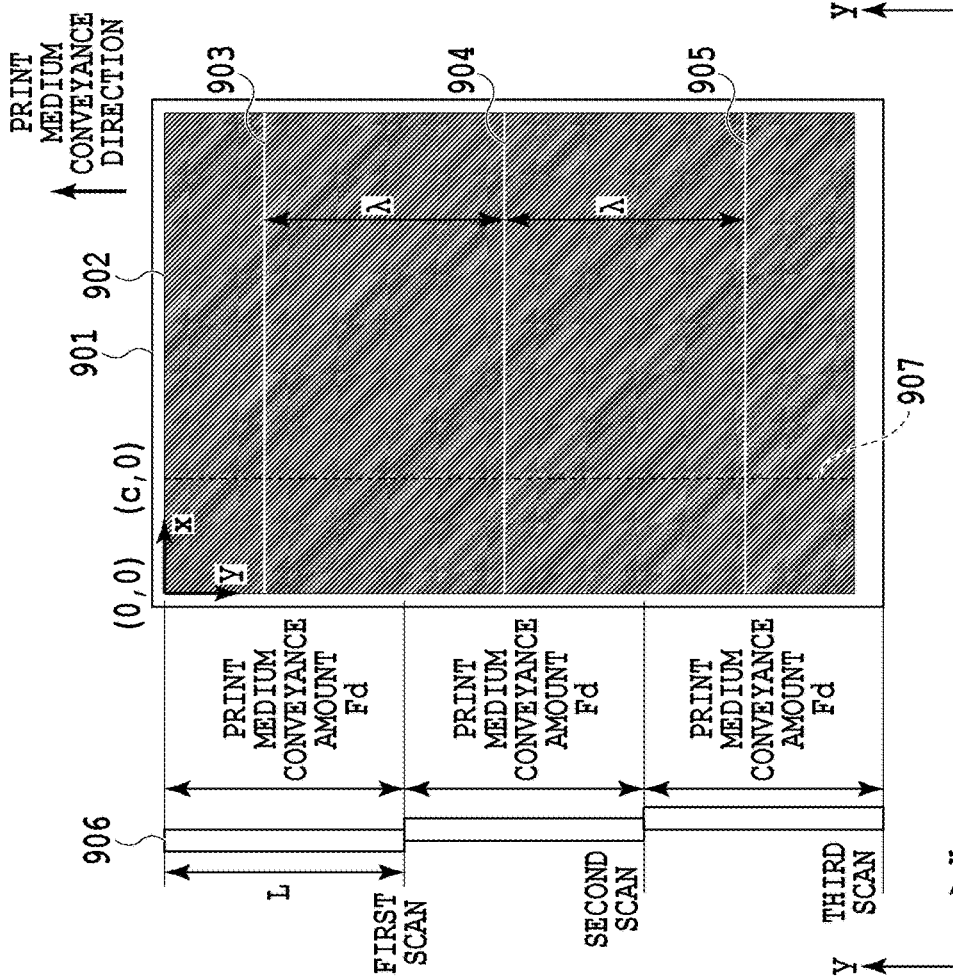
FIG.12A
FIG.12B

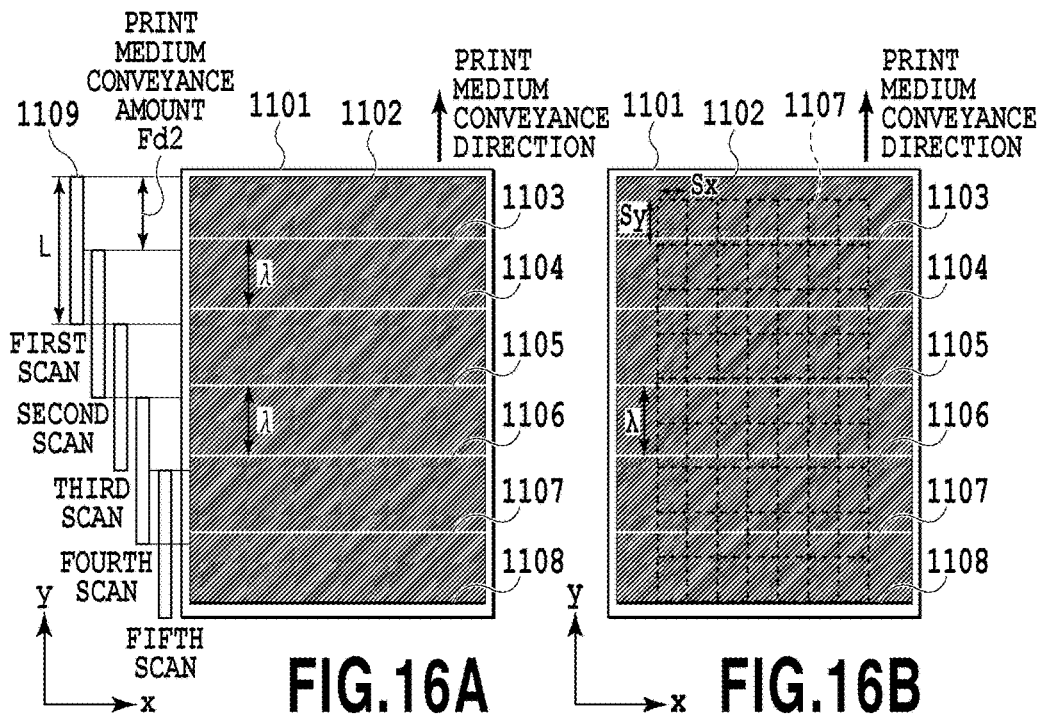
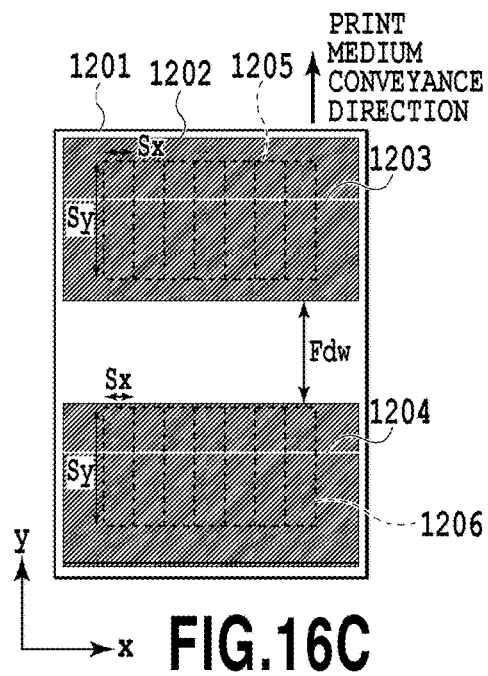
FIG.16A   FIG.16B   FIG.16C

![FIG.22A pixel grid 512x512 with numbered cells, labeled 1901]
FIG.22A
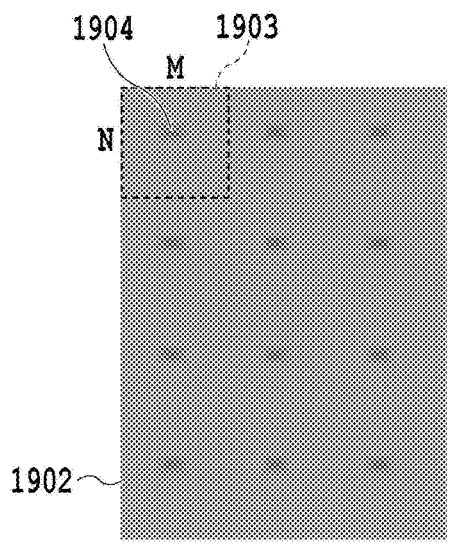
FIG.22B
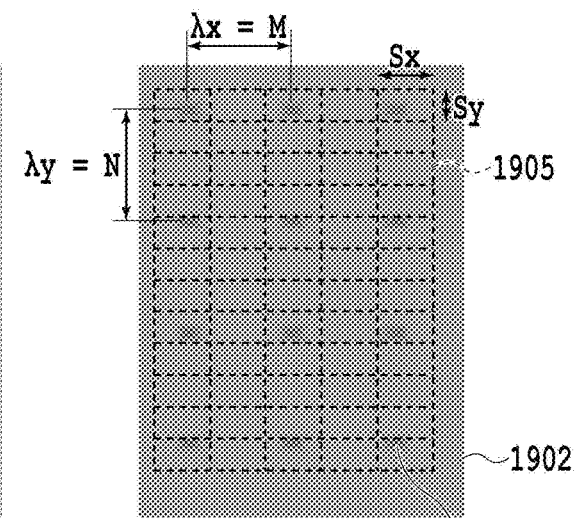
FIG.22C

IMAGE PROCESSING APPARATUS AND METHOD FOR DETECTING UNIQUE PORTIONS PERIODICALLY DISTRIBUTED IN A PRINTED IMAGE

BACKGROUND OF THE INVENTION

Field of the Invention

The present invention relates to an image processing apparatus and an image processing method, and more specifically, to a technique adapted to detect a unique portions such as a striped unevenness that may appear in an printed image by a printer.

Description of the Related Art

As this sort of a unique portion, for example, a so-called white stripe caused by ejection failure of a nozzle among multiple nozzles arrayed in a print head of an inkjet printer, or a density unevenness such as a white stripe or a black stripe caused by an error in the conveyance amount of a print medium is well known. In the past, such a unique portion in a printed image has been typically detected by visual observation by a user, or inspecting an image read by an apparatus such as a scanner.

On the other hand, Japanese Patent Laid-Open No. 2013-185862 or "'KIZUKI' Algorithm inspired by Peripheral Vision and Involuntary Eye Movement", Journal of the Japan Society for Precision Engineering, Vol. 79, No. 11, 2013, which is a non-patent literature, discloses a method for detecting a unique portion from an image resulting from imaging an inspection target in accordance with a process modeling a human visual mechanism. Specifically, the first step is to divide an imaged image into a plurality of areas, and prepare a low resolution image in which luminance values of pixels included in each of the division areas are averaged. The following step is to change the phase and size of each of the division areas in the low resolution image, and obtain an addition value of averaged luminance values in each phase or for each size on a pixel basis. In doing so, when a unique portion is present in a printed image, the unique portion can be detected as a pixel having a large pixel value as compared with surrounding pixels.

However, when unique portions are periodically distributed in a printed image, the detecting method described in Japanese Patent Laid-Open No. 2013-185862 or the above-described non-patent literature sometimes cannot detect the unique portions appearing with an expected period. More specifically, depending on the relationship between the size of each division area in a direction in which the unique portions are periodically distributed and the expected period with which the unique portions are distributed, there is the possibility that the unique portions cannot be appropriately detected.

SUMMARY OF THE INVENTION

The object of the present invention is to provide an image processing apparatus and image processing method that can appropriately detect unique portions periodically distributed in a printed image.

In a first aspect of the present invention, there is provided an image processing apparatus that performs a process of detecting a unique portion that occurs periodically in an inspection target image, the apparatus comprising: a dividing unit configured to divide a part area of the inspection target image into a plurality of division areas each having a predetermined size; an averaging unit configured to change a phase of each of the plurality of division areas in the part area and to average pixel values in each of the plurality of division areas in each of changed phases; an addition unit configured to add averaged values in each of the plurality of division areas in each of changed phases, in relation to pixel positions in the inspection target image; and a setting unit configured to, with respect to a period $\lambda$ with which the unique portion of a detection target appears, set a size S of each of the plurality of division areas in a direction in which the unique portion may appear with the period $\lambda$, so as to meet $S<\lambda$.

In a second aspect of the present invention, there is provided an image processing apparatus that performs a process of detecting a unique portion that occurs periodically in an inspection target image, the apparatus comprising: a filtering unit configured to perform a filtering process that averages pixel values in pixels consist of a pixel of a part area of the inspection target image and peripheral pixels of the pixel of the part area of the inspection target image, which are determined according to a size of a filter, for each of pixels of the part area of the inspection target image; an addition unit configured to add values resulting from the filtering process for each of pixels of the part area of the inspection target image in relation to pixel positions in the inspection target image; and a setting unit configured to, with respect to a period $\lambda$ with which the unique portion of a detection target appears, set a size S in the filtering process in a direction in which the unique portion may appear with the period $\lambda$, so as to meet $S<\lambda$.

In a third aspect of the present invention, there is provided an image processing method for performing a process of detecting a unique portion that occurs periodically in an inspection target image, the method comprising: a dividing step (S13) of dividing a part area (1001) of the inspection target image into a plurality of division areas each having a predetermined size; an averaging step (S13) of changing a phase of each of the plurality of division areas in the part area and to average pixel values in each of the plurality of division areas in each of changed phases; an addition step (S15) of adding averaged values in each of the plurality of division areas in each of changed phases, in relation to pixel positions in the inspection target image; and a setting step (S11) of, with respect to a period $\lambda$ with which the unique portion of a detection target appears, setting a size S of each of the plurality of division areas in a direction in which the unique portion may appear with the period $\lambda$, so as to meet $S<\lambda$.

In a fourth aspect of the present invention, there is provided an image processing method for performing a process of detecting a unique portion that occurs periodically in an inspection target image, the method comprising: a filtering step (S163) of performing a filtering process that averages pixel values in pixels consist of a pixel of a part area of the inspection target image and peripheral pixels of the pixel of the part area of the inspection target image, which are determined according to a size of a filter, for each of pixels of the part area of the inspection target image; an addition step (S165) of adding values resulting from the filtering process for each of pixels of the part area of the inspection target image in relation to pixel positions in the inspection target image; and a setting step (S161) of, with respect to a period $\lambda$ with which the unique portion of a detection target appears, setting a size S in the filtering process in a direction in which the unique portion may appear with the period $\lambda$, so as to meet $S<\lambda$.

The above-described configuration makes it possible to appropriately detect unique portions periodically distributed in a printed image.

Further features of the present invention will become apparent from the following description of exemplary embodiments (with reference to the attached drawings).

BRIEF DESCRIPTION OF THE DRAWINGS

FIGS. 7A to 7C are diagrams for explaining a method for generating dummy data according to one embodiment of the present invention;

FIGS. 12A and 12B are diagrams illustrating white stripes appearing in a printed image;

FIGS. 16A to 16C are diagrams illustrating other examples of a method for determining the periodicity of a unique portion according to one embodiment of the present invention;

FIGS. 22A to 22C are diagram illustrating textures caused by a dither process and how to detect the textures according to a third embodiment of the present invention.

DESCRIPTION OF THE EMBODIMENTS

Embodiments of the present invention will hereinafter be described in detail with reference to the attached drawings.

Figure 1A:
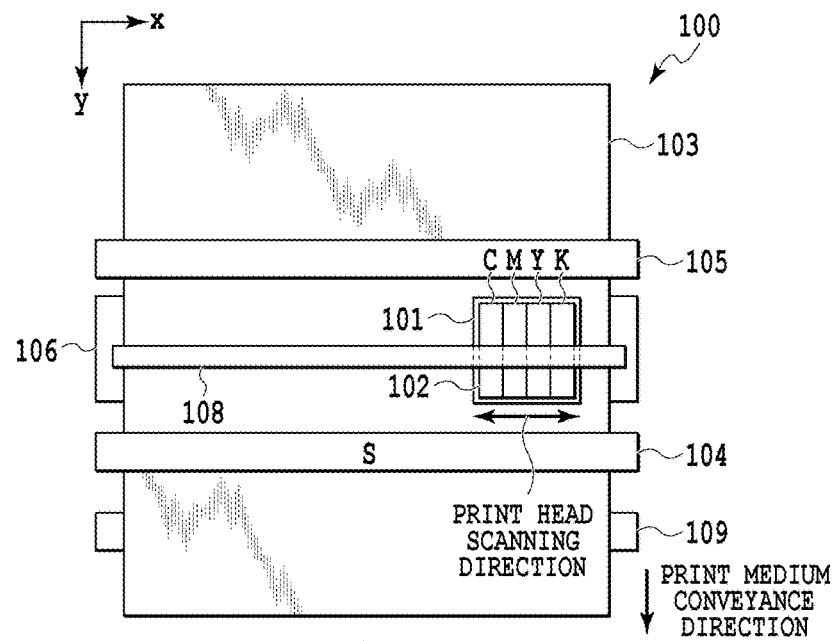
FIGS. 1A and 1B are diagrams schematically illustrating an inkjet printer and a print head according to one embodiment of the present invention.
Figure 1B:
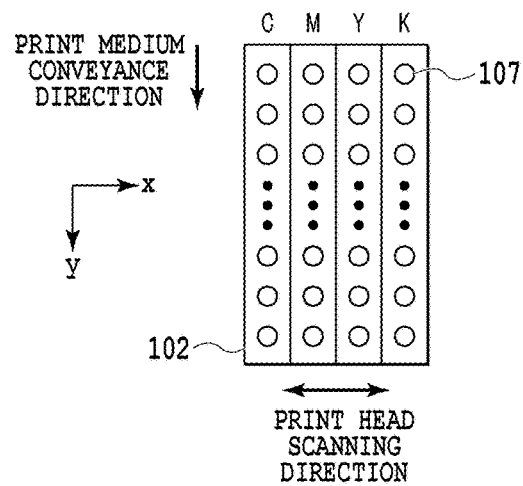

FIGS. 1A and 1B are diagrams schematically illustrating an inkjet printer and a print head according to one embodiment of the present invention. The printer 100 of the present embodiment is a serial type printing apparatus adapted to scan the print head over a print medium to perform printing.

The print head 102 is one that ejects cyan (C), magenta (M), yellow (Y), and black (K) inks, and as illustrated in FIG. 1B, includes multiple arrays of nozzles (printing elements) 107 on an ink color basis. In addition the respective nozzles are provided facing to a sheet 103 in FIG. 1A, and can thereby eject corresponding inks onto the sheet 103. Note that the number and arrangement of nozzles are of course not limited to those exemplified in the diagrams, and for example, nozzle arrays having different ink ejection amounts may be prepared for the same color. Alternatively, multiple arrays of nozzles having the same ejection amount may be arranged or nozzles may be zigzag arranged. The print head 102 is detachably attached on a carriage 101. The carriage 101 can be moved along a guiderail by an unillustrated driving mechanism, and thereby the print head 102 can scan the print medium in a direction indicated by an arrow X in the diagrams, and in a direction opposite to that direction.

The sheet 103 as a print medium is conveyed in a Y direction intersecting with the X direction in the diagrams by a conveyance roller 105 (and other unillustrated rollers) and discharge roller 109 (and other unillustrated spur rollers) rotated by driving force of a motor (not illustrated). A platen 106 is provided in a print area facing to a surface (ejection surface) formed with ejection ports by scanning of the print head 102, and supports the back surface of the sheet 103. In doing so, the distance between the front surface of the print medium 103 and the ejection surface can be kept at a constant distance.

The print medium 103 conveyed onto the platen 106 and printed is further conveyed, and thereby a printed image is read by a scanner 104. That is, the scanner 104 has reading elements arrayed at predetermined pitches in the X direction, and reads the printed image. A result of the reading is outputted in a form such as color RGB data or monochrome gray data. A printed image at the time of performing the below-described image inspection is also read by the scanner 104.

Figure 2:
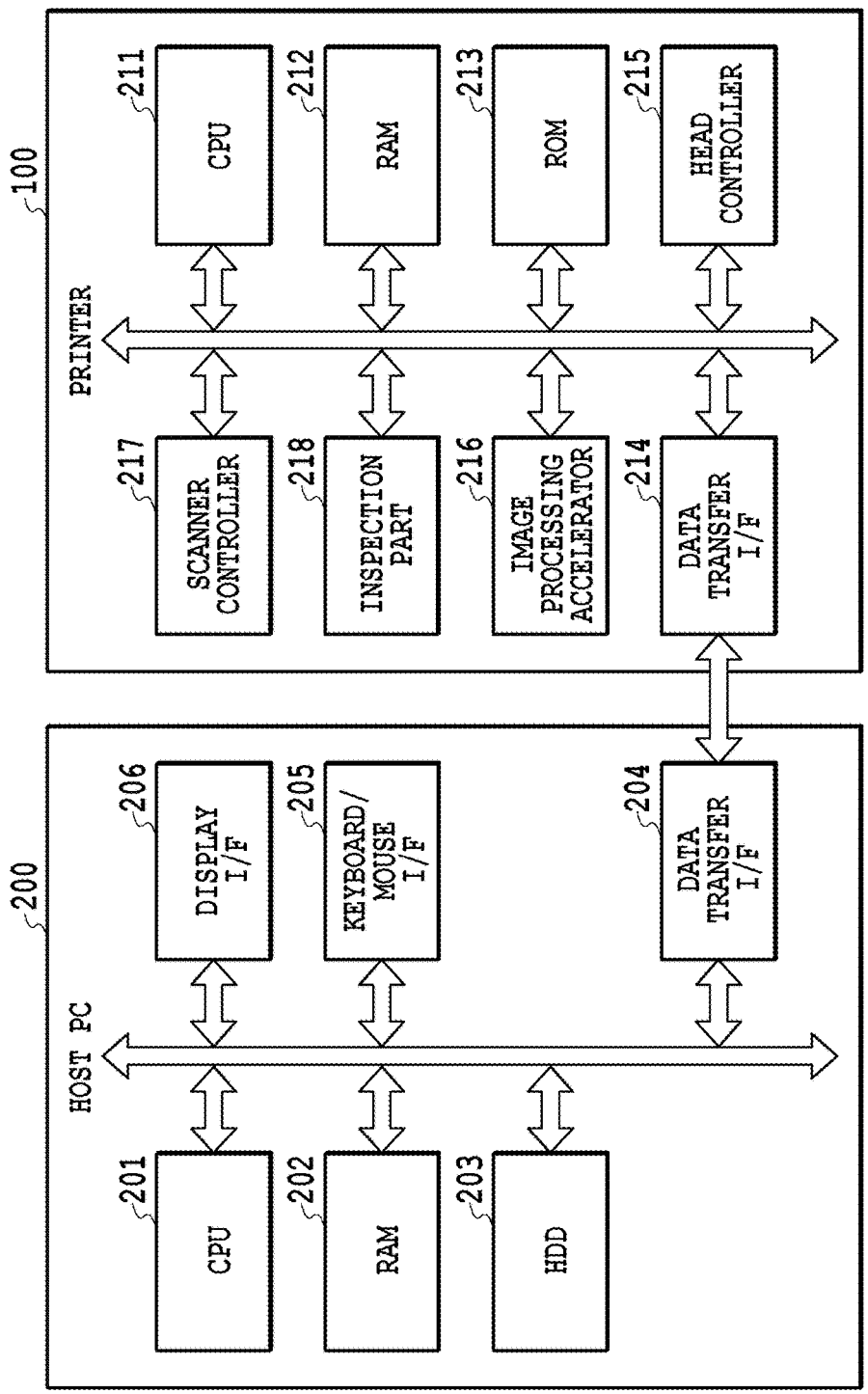
FIG. 2 is a block diagram illustrating a printing system that is configured to have the printer illustrated in FIG. 1 and a personal computer (PC) as a host apparatus.

FIG. 2 is a block diagram illustrating a printing system that is configured to have the printer illustrated in FIG. 1 and a personal computer (PC) 200 as a host apparatus.

The host PC 200 is configured to have mainly the following components. A CPU 201 performs a process in accordance with a program held in an HDD 203 or a RAM 202 as a storage unit. The RAM 202 is a volatile storage unit, and temporarily stores a program and data. The HDD 203 is a nonvolatile storage unit, and similarly stores a program and data. A data transfer I/F (interface) 204 controls data transception with the printer 100. As a connecting method for the data transception, a method such as USB, IEEE 1394, or LAN can be used. A keyboard/mouse I/F 205 is an I/F adapted to control HIDs (Human Interface Devices) such as a keyboard and a mouse, and a user can input information through this I/F. A display I/F 206 controls display on a display (not illustrated).

On the other hand, the printer 100 is configured to have mainly the following components. A CPU 211 performs a process in accordance with a program held in a ROM 213 or a RAM 212. The RAM 212 is a volatile storage unit, and temporarily stores a program and data. The ROM 213 is a nonvolatile storage unit, and can store a program and data for a process such as one adapted to detect a unique portion such as a striped unevenness in a printed image by an inspection part 218, which will be described later with drawings such as FIG. 3.

A data transfer I/F 214 controls data transception with the PC 200. A head controller 215 supplies print data to the respective nozzle arrays of the print head 102 illustrated in FIG. 1 as well as controlling an ejecting action of the print head. Specifically, the head controller 215 reads control parameters and print data from a predetermined address of the RAM 212. On the other hand, the CPU 211 writes the control parameters and the print data into a predetermined address of the RAM 212. Thereby the head controller 215 is activated to perform ejecting inks from the print head. A scanner controller 217 controls the respective reading elements of the scanner 104 illustrated in FIG. 1, as well as outputting RGB data obtained from the reading elements to the CPU 211.

An image processing accelerator 216 is hardware capable of performing an image process at higher speed than the CPU 211. Specifically, the image processing accelerator 216 reads parameters and data necessary for the image process from a predetermined address of the RAM 212. On the other hand, the CPU 211 writes the parameters and the data into the predetermined address of the RAM 212. Thereby the image processing accelerator 216 is activated to perform the predetermined image process on the data. Note that the image processing accelerator 216 is not an indispensable component, and depending on the specifications of the printer, only the CPU 211 may perform the image process.

The inspection part 218 inspects a unique portion such as a striped unevenness in an inspection image obtained by the scanner 104, and feeds back information on a result of the inspection to the CPU 211. For example, when the described later striped unevenness caused by ejection failure of the print head has been detected, the inspection part 218 feeds back information on the detection of the striped unevenness so as to perform a process adapted to substitute nozzles having no ejection failure for the nozzles having ejection failure in the print head. Also, in a mode adapted to detect a unique portion simultaneously with printing by the printer, when the unique portion is detected, a process of automatically stopping a printing action of the printing apparatus may be performed. Further, a result of inspecting a unique portion may be notified to a printer user. For example, by notifying whether or not a unique portion is present, when the unique portion is present, the user can stop the printing action. Further, by notifying the type of a detected unique portion, depending on the details of the detected unique portion, the user can also change a print control method. Methods for the notification include a method such as displaying on a UI of the display of the PC or the printer or lighting a lamp.

Figure 3:
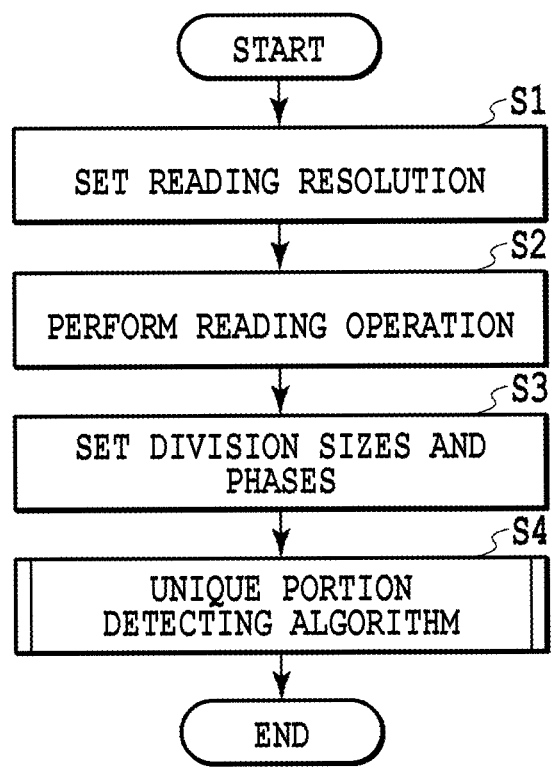
FIG. 3 is a flowchart illustrating a unique portion detecting process performed in the printer of the present embodiment.

FIG. 3 is a flowchart illustrating a unique portion detecting process performed by the printer 100 of the present embodiment. When this process is started, the printer 100 sets a reading resolution in Step S1. A specific method for the setting will be described later. Subsequently, in Step S2, in accordance with the reading resolution set in Step S1, the reading operation is performed on an image as an inspection target. More specifically, the scanner controller 217 drives the scanner 104 to obtain output signals from multiple reading elements of the scanner 104. Then, on the basis of the output signals, image data having the reading resolution set in Step S1 is generated. In the present embodiment, image data is adapted to represent each pixel using R (red), G (green), and B (blue) luminance signals each having any value of 0 to 255.

In Step S3, the CPU 211 sets a division size and a phase to be used for the unique portion detecting process in subsequent Step S4. In Step S3, at least one or more division sizes and at least one or more phases are set. After that, in Step S4, on the basis of the division sizes and the phases set in Step S3, the unique portion detecting process is performed on the image data generated in Step S2.

Figure 4:
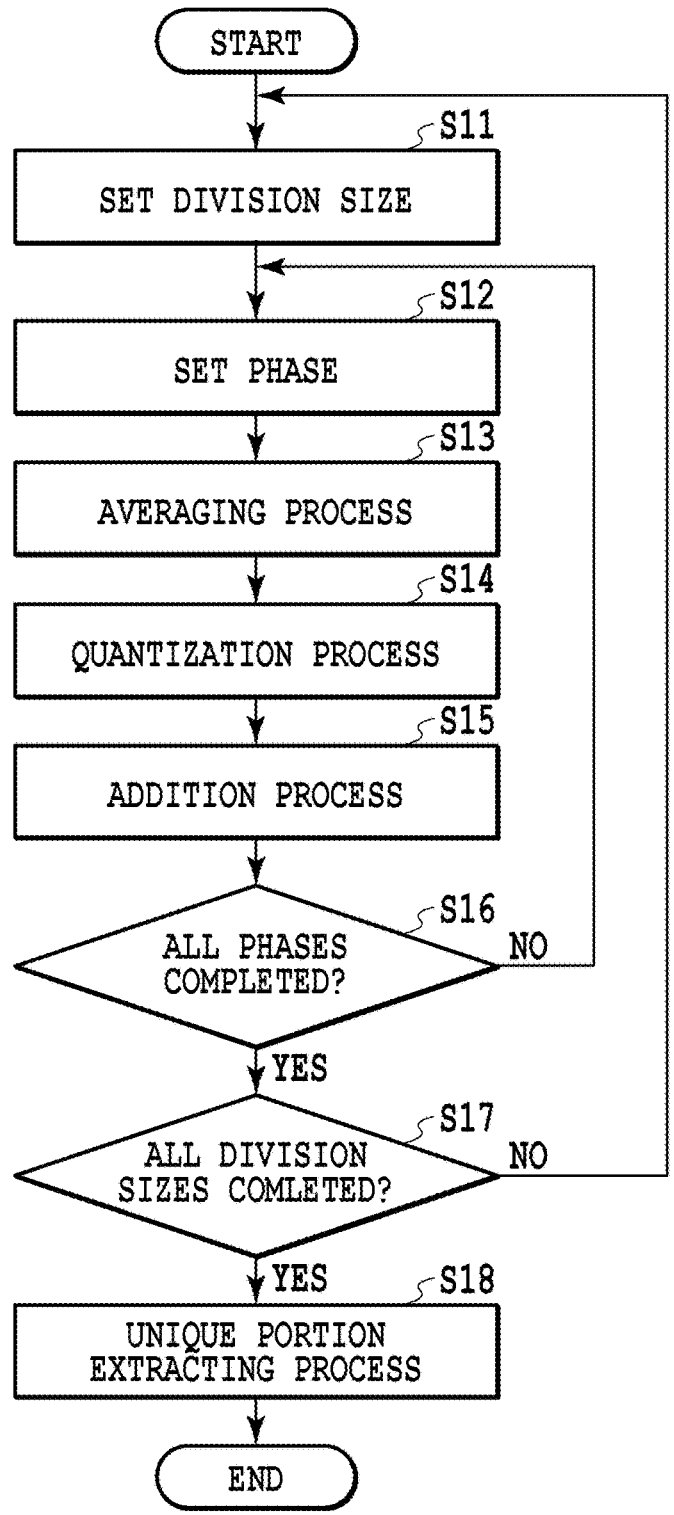
FIG. 4 is a flowchart illustrating the details of the unique portion detecting process performed in Step S4 of FIG. 3 according to one embodiment of the present invention.

FIG. 4 is a flowchart illustrating the details of the unique portion detecting process, which is performed in Step S4 of FIG. 3, according to one embodiment of the present invention. When this process is started, in Step S11, the CPU 211 first sets one division size from among the plurality of division sizes set in Step S3. Further, in Step S12, the CPU 211 sets one phase from among the plurality of phases set in Step S3. Then, in Step S13, on the basis of the division size set in Step S11 and the phase set in Step S12, the image data acquired in Step S2 is divided to perform an averaging process.

Figure 5A:
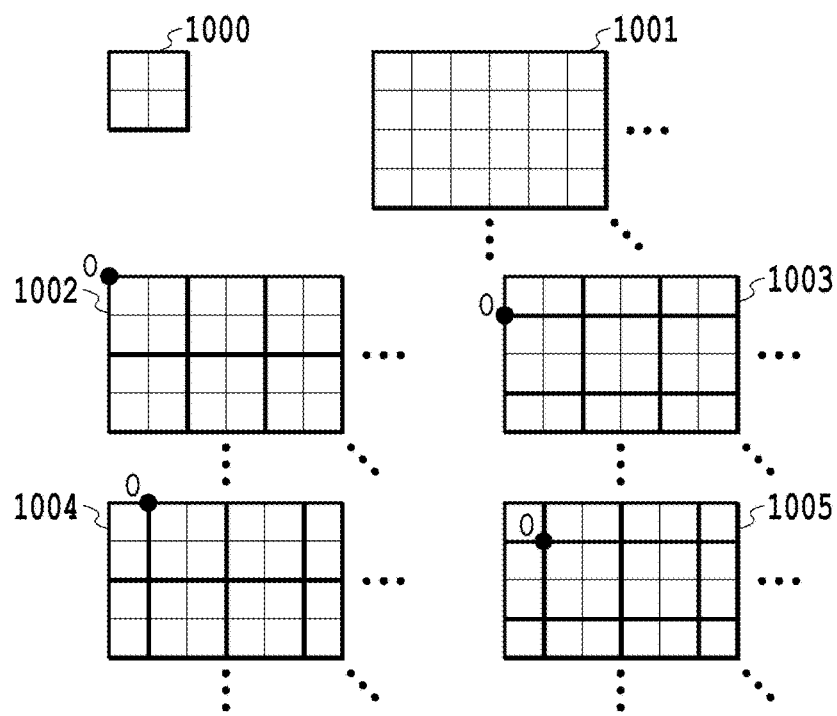
FIGS. 5A and 5B are diagrams respectively illustrating examples of dividing image data on the basis of a division size and a phase.
Figure 5B:
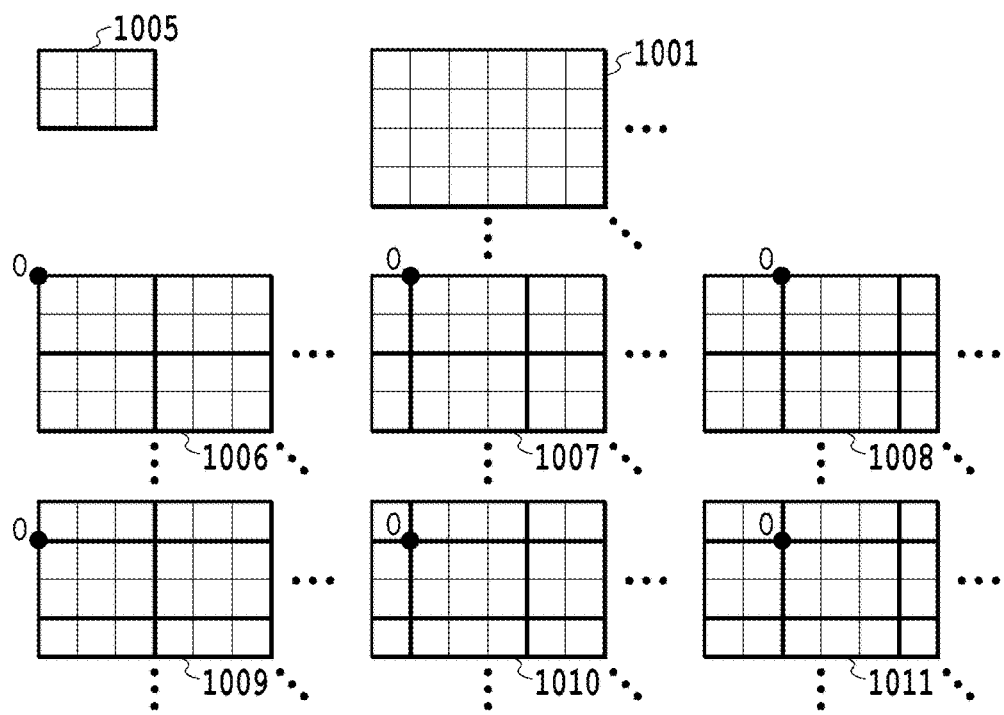
Figure 6A:
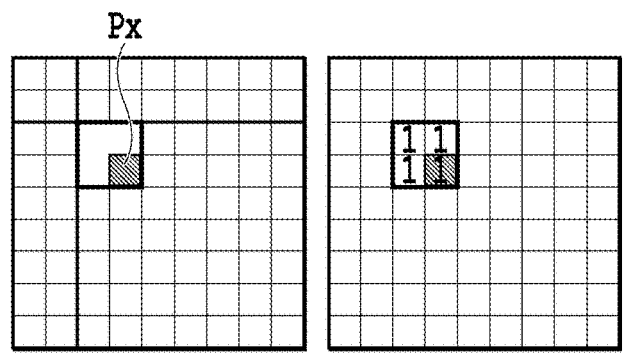
FIGS. 6A to 6E are diagrams illustrating the steps of an addition process sequentially performed in Step S15 of FIG. 4 in all phases in the case of a division size set to 2×2 pixels.
Figure 6B:
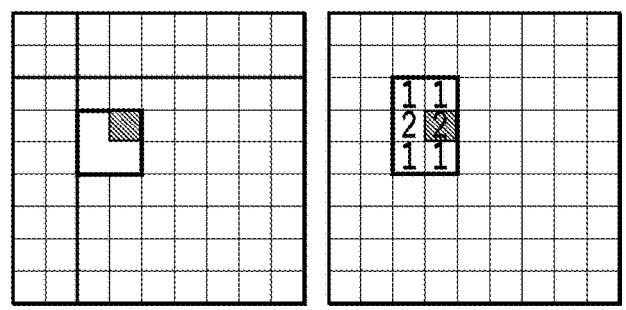
Figure 6C:
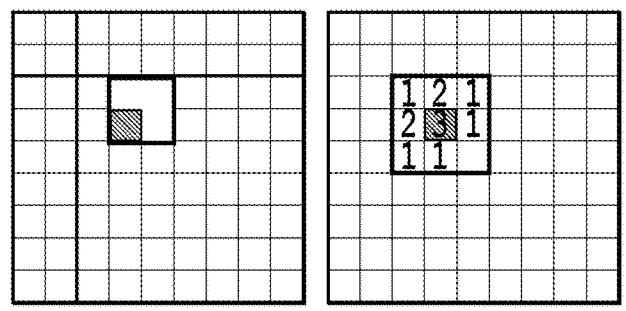
Figure 6D:
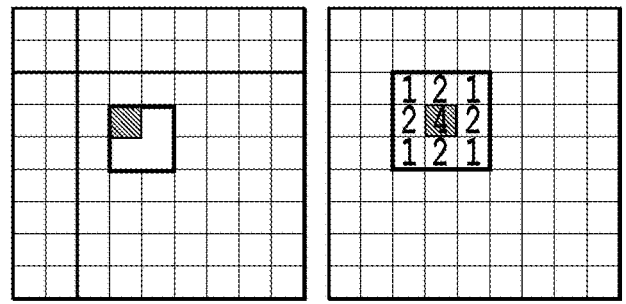
Figure 6E:
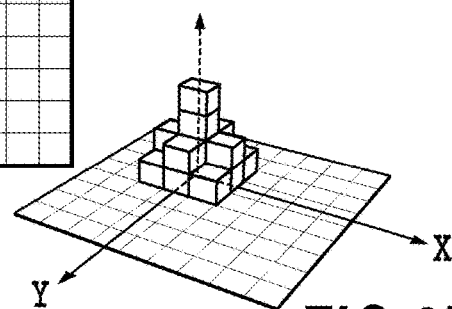

FIGS. 5A and 5B are diagrams respectively illustrating examples of dividing image data on the basis of a division size and a phase. FIG. 5A illustrates the case where the division size is set to 2×2 pixels, and FIG. 5B illustrates the case where the division size is set to 3×2 pixels. In the case where the division size 1000 is set to 2×2 pixels as illustrated in FIG. 5A, an image data area 1001 is divided on a 2×2 pixel basis, and can be divided in four different ways as indicated by 1002 to 1005. As described, the phase can be considered as indicating the origin O of a designated division size. In the case where the division size 1005 is set to 3×2 pixels as illustrated in FIG. 5B, the image data area 1001 can be divided in six different ways as indicated by 1006 to 1011, meaning that six different phases are present. A phase change that sequentially changes a phases is made among the different phases, and within a corresponding division area, averaging, quantization, and addition are performed.

In the embodiments of the present invention, as will be described later with reference to FIG. 13 and subsequent drawings, for example, a division size in the print medium conveyance direction (e.g., in the above examples, 2-pixel size) is determined by the relationship with the expected period of a unique portion to be detected.

Note that as the division size is increased, the number of settable phases also increases; however, it is not necessarily required to set all phases for one division size. It is only necessary to set at least one or more phases from among settable phases in Step S3 of FIG. 3, and in Step S12 of FIG. 4, one of the several phases set in Step S3 is set.

Referring to FIG. 4 again, in Step S13, the averaging process is performed for each of division areas obtained by the division. Specifically, an average value of pieces of luminance data (luminance values) of multiple pixels included in each of the division areas (in the example of FIG. 5A or 5B, 2×2=4 pixels or 2×3=6 pixels) is obtained. Then, values of the pixels included in that division area for which the average value is obtained are replaced by the obtained average value. That is, in each of the above examples, the 2×2 or 2×3 pixel division area is treated as 1×1 pixel division area by the averaging process in the present embodiment, thus resulting in a reduction in resolution.

When obtaining the average value, luminance data of each of the pixels may have a value obtained by directly averaging luminance values (any of 0 to 255) of pieces of RGB data of that pixel, or by multiplying the pieces of RGB data respectively by predetermined weighting coefficients and then adding the pieces of weighted data. Also, any one of the pieces of RGB luminance data may be directly used as luminance data of that pixel. Further, not the average value but the median value of the multiple pixels of that division area may be used.

Subsequently, in Step S14, the average value calculated in Step S13 for that division area is quantized on a pixel basis. In the present embodiment, a binary value is obtained by binarization; however, the number of levels obtained in this quantization is not limited to two, but may be lower than 256 for each of RGB. The quantization process here is performed by comparing a predetermined threshold value, e.g., the median value of pixel values in the image data as an inspection target, with the obtained average value. Through the above-described quantization process, quantized data in a state where quantized values of respective pixels are uniform within each of the division areas can be obtained.

In Step S15, the quantized values obtained in Step S14 are added to addition image data. The addition image data refers to image data indicating a result of adding pieces of quantized data obtained when variously changing the division size and the phase. More specifically, the addition is performed related to a pixel position in addition image data. When the quantized data obtained in Step S14 is based on the initial phase corresponding to the initial division size, the addition image data obtained in Step S15 is the same as the quantized data obtained in Step S14.

In subsequent Step S16, it is determined whether or not all phases corresponding to a currently set division size have been processed. When it is determined that a phase to be processed still remains, the flow returns to Step S12, where the next phase is set. On the other hand, when it is determined that all the phases have been processed, the flow proceeds to Step S17.

FIGS. 6A to 6E are diagrams illustrating the steps of an addition process sequentially performed in Step S15 for all phases in the case of a division size set to 2×2 pixels illustrated in FIG. 5A. In the case of the division size of 2×2 pixels, four phases are present. As a numeral illustrated in FIGS. 6A to 6E, in the process of sequentially changing the four different phases, the number of times of using binary data of a peripheral pixel in order to perform the addition process with respect to a target pixel Px is indicated on a pixel basis. When generalizing the number of phases, and representing the sizes of a division area in the X and Y directions by the numbers of pixels, i.e., Sx and Sy, the division size can be represented by Sx×Sy.

As illustrated in FIGS. 6A to 6E, when changing a phase of the division area illustrated in FIG. 5A, the target pixel Px has the largest number of additions because the target pixel Px itself is used in all phases included in a division area, and has the largest contribution to an addition result. A pixel more distant from the target pixel Px has a smaller number of additions, and has a smaller contribution to the addition result. That is, a final result obtained is such that a filtering process is performed with the target pixel as the center.

Meanwhile, as described with FIGS. 6A to 6E, the unique portion detecting process in the present embodiment calculates addition data on the basis of the average value of all pixels included in a division area that moves around a target pixel Px. For this reason, a pixel positioned in an end part of printed image data may not be properly processed because a division area includes an area where no data is present. In order to respond to such a situation, in the present embodiment, dummy image data is attached in advance around inspection target image data.

FIGS. 7A to 7C are diagrams for explaining a method for generating dummy data according to the present embodiment. In each of the diagrams, an area corresponding to printed image data as an inspection target is indicated as a shaded area. As illustrated in FIG. 7A, when a target pixel Px indicated in black is positioned at a corner of the inspection target area, a division area (solid line) around the target pixel Px, and a division area (dashed line) having a phase shifted from that of the former respectively include areas (white areas) where no data is present. For this reason, in the present embodiment, dummy data is generated such that even when using the maximum division size to set the maximum movement distance with respect to the target pixel Px, appropriate data is present in any pixel included in a division area.

FIG. 7B is a diagram illustrating the method for generating dummy data. Four images obtained by inverting inspection target image data point-symmetrically with respect to apices A, B, C, and D, respectively, and four images obtained by inverting the inspection target image data line-symmetrically with respect to sides AB, BC, CD, and DA, respectively are generated, and these eight images surround the inspection target image data. It is here assumed that for example, the maximum division size and the maximum movement distance in the unique portion detecting process are respectively represented by (Sx, Sy) and (Kx, Ky). In this case, the dummy data is generated in an area that is extended from the four edges of the inspection target image data by $Fp=(Sx/2)+Kx$ in the ±X directions and by $Fq=(Sy/2)+Ky$ in the ±Y directions. FIG. 7C illustrates the inspection target image data that is added with the dummy data in this manner.

Referring to FIG. 4 again, in Step S17, it is determined whether or not all the division sizes set in Step S3 have been processed. When it is determined that a division size to be processed still remains, the flow returns to Step S11, where the next division size is set. On the other hand, when it is determined that all the division sizes have been processed, the flow proceeds to Step S18.

In Step S18, the unique portion extracting process is performed on the basis of addition image data obtained in the above manner. A method for the extracting process is not particularly limited. As the method, a publicly known determination processing method can be used, such as a method adapted to, as a unique portion, extract a division area where a predetermined difference in integrated value or more is present as compared with integrated values of peripheral division areas.

<Way Using Gaussian Filter>

The above-described extracting process can also be performed using a Gaussian filter. In the above-described embodiment, as described with FIG. 4, the process adapted to obtain an addition result of average values in a plurality of phases of a division size is performed. Meanwhile, as described above, such a process finally results in a filtering process with a target pixel as the center. The present embodiment is adapted to replace the addition process performed in the plurality of phases of a fixed division size by an addition process performed using weighting coefficients derived from a Gaussian filter.

Figure 8A:
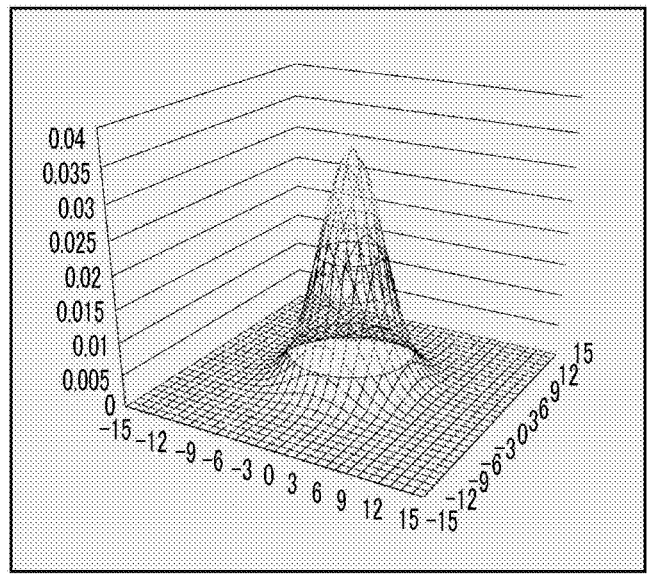
FIGS. 8A and 8B are diagrams illustrating examples of a Gaussian filter according to one embodiment of the present invention.
Figure 8B:
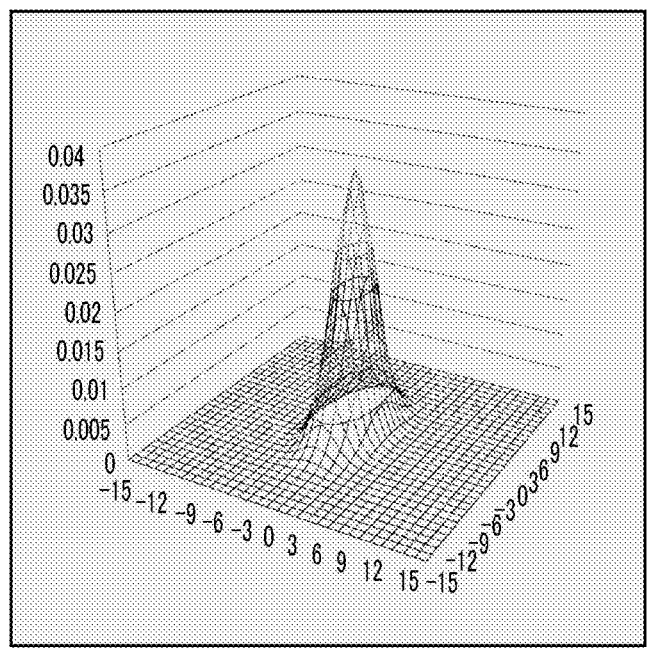

FIGS. 8A and 8B are diagrams illustrating examples of the Gaussian filter. FIG. 8A illustrates an isotropic Gaussian filter, which can be expressed by Expression (1).

$$f(x, y) = \frac{1}{2\pi\sigma^2} \exp\left(-\frac{x^2 + y^2}{2\sigma^2}\right) \quad (1)$$

Here, σ represents a standard deviation.

Such an isotropic Gaussian filter corresponds to the above-described case of using a square division size such as 2×2 or 3×3. On the other hand, FIG. 8B illustrates an anisotropic Gaussian filter, and corresponds to the above-described case of using a rectangular division size such as 2×3. Such an anisotropic Gaussian filter can be generated by deviating the ratio between x and y in Expression (1). For example, FIG. 8B corresponds to a Gaussian filter generated by replacing x in Expression (1) by x'=x/2. The present embodiment can employ any of the Gaussian filters. However, in the following, the description will be continued while taking the isotropic Gaussian filter illustrated in FIG. 8A as an example.

The Gaussian filter in FIG. 8A represents coefficients of respective pixels positioned within the ranges of −15≤X≤15 and −15≤Y≤15 with a target pixel as the origin. A form adapted to set the coefficients within the ranges of −15≤X≤15 and −15≤Y≤15 as described corresponds to the addition process as illustrated in FIGS. 6A to 6E performed with the above-described division size set to 15×15 pixels. That is, given that the size (diameter) of the Gaussian filter is represented by F, and the above-described division size is represented by V×V, the size F can be expressed by F≈2V−1. In addition, by adjusting the Gaussian filter size F as well as the standard deviation σ, Gaussian filters having various sizes can be used. The present embodiment is adapted to obtain results of respectively using a plurality of Gaussian filters having different sizes to perform a filtering process on luminance data of a target pixel and further performing quantization, and add the results. In doing so, a unique portion extracting process can be performed on the basis of the addition result equivalent to the above-described addition result.

Figure 9:
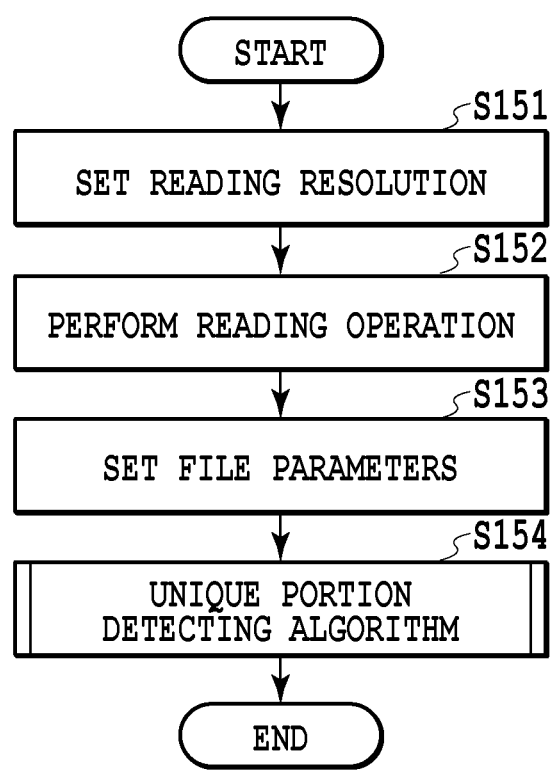
FIG. 9 is a flowchart illustrating a unique portion detecting process using a Gaussian filter according to one embodiment of the present invention.

FIG. 9 is a flowchart illustrating a unique portion detecting process using the Gaussian filter in the present embodiment. When this process is started, a reading resolution is first set in Step S151, and in subsequent Step S152, a reading operation is performed on an inspection target. Steps S151 and S152 described above are equivalent to Steps S1 and S2 of FIG. 3.

In Step S153, a plurality of different file parameters of the Gaussian filter used for the unique portion extracting process to be performed in subsequent Step S154 are set. The file parameters refer to parameters for designating the directionality of a Gaussian function and a different filter size F as described with FIGS. 8A and 8B. Then, in Step S154, on the basis of the file parameters set in Step S153, the unique portion detecting process is performed on image data generated in Step S152 as an inspection target.

Figure 10:
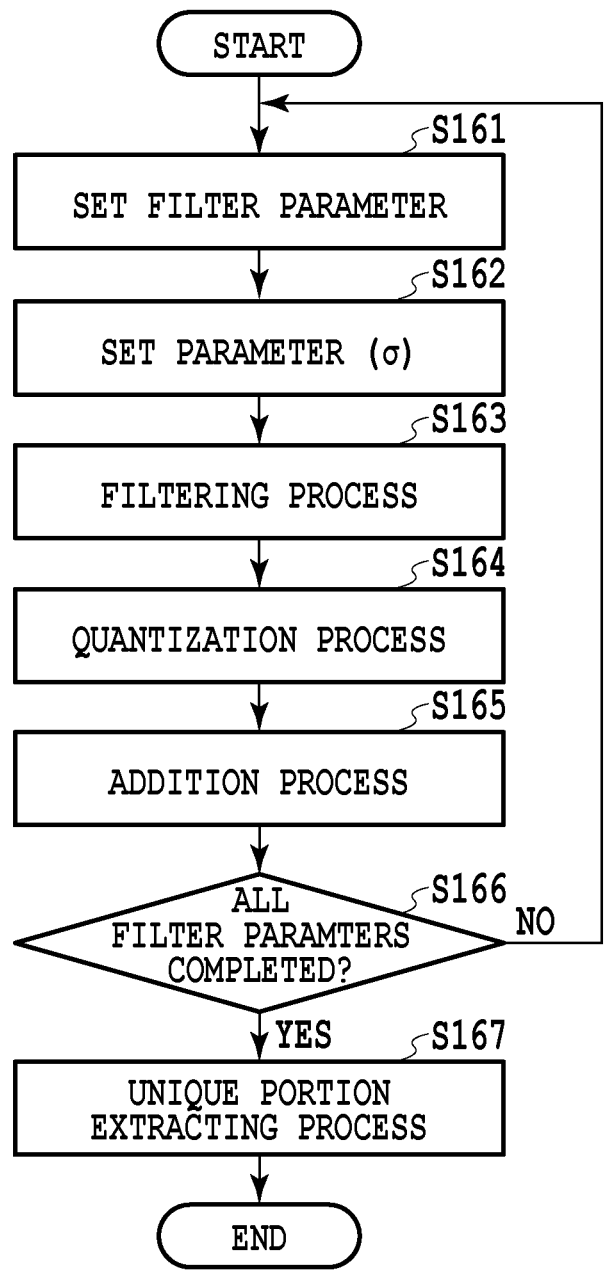
FIG. 10 is a flowchart illustrating the details of the unique portion detecting process performed in Step S154 of FIG. 9.

FIG. 10 is a flowchart illustrating the details of the unique portion detecting process performed in Step S154 of FIG. 9. When this process is started, in Step S161, one file parameter is set from among the plurality of file parameters set in Step S153. Further, in Step S162, a parameter σ corresponding to the file parameter set in Step S161 is set. The parameter σ corresponds to the standard deviation of a Gaussian function, and is assumed to be preliminarily stored in a memory related to the file parameter and/or a filter size. Setting the file parameter and the parameter σ in Steps S161 and S162 determines the shape of the Gaussian filter.

Subsequently, in Step S163, the Gaussian filter set in Steps S161 and S162 is used to perform a filtering process on the image data acquired in Step S152. Specifically, pieces of luminance data of the target pixel and peripheral pixels falling within the filter size F are multiplied by coefficients determined by the Gaussian filter, and the sum of the pieces of luminance data multiplied by the coefficients is calculated as a filtering process value for the target pixel.

In Step S164, a quantization process is performed using a predetermined threshold value on the filtering process value obtained in Step S163, and further, in Step S165, a quantized value obtained in Step S164 is added to addition image data. The addition image data refers to image data indicating a result of adding pieces of quantized data obtained when variously changing a file parameter setting value, i.e., variously changing the type of a Gaussian filter. When the quantized data obtained in Step S164 corresponds to a processing result using the initial Gaussian filter, the addition image data is the same as the quantized data obtained in Step S164.

The above processes in Steps S163 to S165 are performed for all pixels in the image data as an inspection target while moving the target pixel. In Step S166, it is determined whether or not all the file parameters set in Step S153 have been processed. When it is determined that a file parameter to be processed still remains, the flow returns to Step S161, where the next file parameter is set. On the other hand, when it is determined that all the file parameters have been processed, the flow proceeds to Step S167. In Step S167, on the basis of the addition image data, the unique portion extracting process is performed. An extracting method is the same as that illustrated in FIG. 4.

In addition, in the form using the Gaussian filter, the above-described dummy data for division areas is generated as follows. When generating the addition image data, the sizes Fp and Fq of the dummy data are set as Fp=INT(Fx/2) and Fq=INT(Fy/2), where Fx and Fy represent the X and Y components of the maximum Gaussian filter size F used for the unique portion detecting algorithm.

Note that information on a unique portion extracted in accordance with each of the extracting processes in the above two modes can then be used for various applications. For example, when inspecting a unique portion of an image, a user can display the unique portion as a popup in order to make the unique portion easily determinable. In this case, the user can confirm the unique portion on the basis of a popup image, and repair the unique portion or eliminate the image as a defective image. In addition, the information on the unique portion can also be stored in a memory for use in another system.

Further, in the case of a device having a function of correcting the unique portion to a normal state, the information on the unique portion can be used for a correction process. For example, when an area where luminance is high or low as compared with surrounding areas is extracted, an image processing parameter for correction can be prepared for that area. Further, it is also possible to detect whether or not ejection failure is present in the inkjet printing apparatus, and if present, perform a maintenance process on an ejection port at a relevant position.

Thus, in the above-described unique portion detecting process, since a unique portion is extracted on the basis of the addition of pieces of quantized data obtained when variously changing the division size and the phase, the substantial unique portion can be made apparent while suppressing noise caused by each read pixel to an appropriate level.

Meanwhile, when the features of a unique portion as a detecting target are predictable, it is effective to, in the above-described unique portion detecting algorithm, adjust the division size at the time of reading an inspection image depending on the features. In the following, some embodiments of the unique portion detecting process will be described in terms of the relationship between the period of a unique portion predicted to appear in a printed image and the division size.

First Embodiment

A first embodiment of the present invention is adapted to determine the size S of a division area used to inspect a printed image in a print medium conveyance direction depending on the period $\lambda$ of a striped unevenness that may appear in the printed image.

Figure 11:
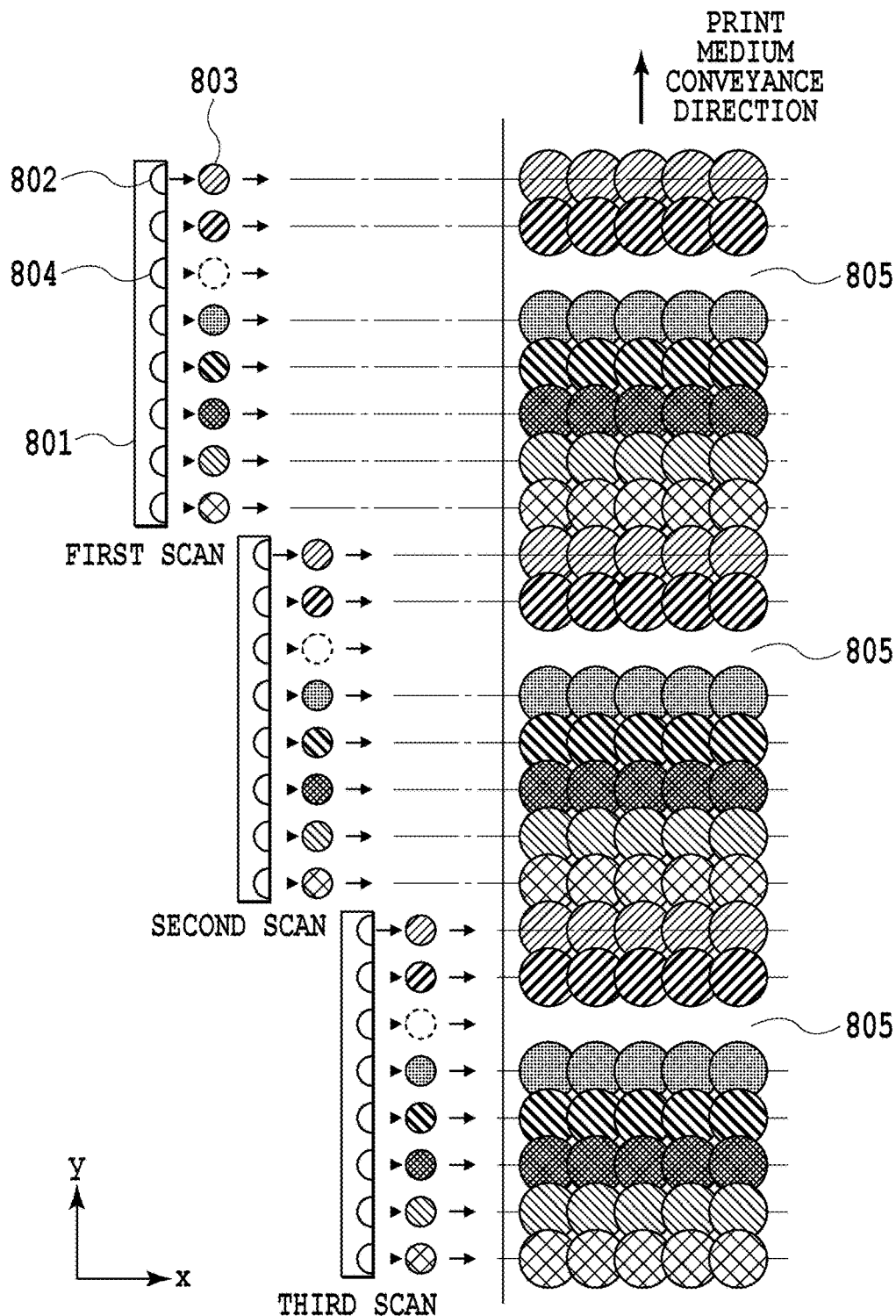
FIG. 11 is a diagram illustrating striped unevennesses that may appear when using a serial-line type inkjet printer according to one present embodiment of the present invention.

FIG. 11 is a diagram illustrating a striped unevenness that may appear when using a serial-line type inkjet printer according to the present embodiment. If there is a nozzle 804 causing improper ejection such as ejection failure among multiple nozzles of a print head, a white stripe 805 periodically appears in a printed image. By repeating a scan by the print head including the ejection failure nozzle and the conveyance of a print medium, the white stripe repeatedly appears in the printed image in accordance with the amount of the conveyance.

FIGS. 12A and 12B are diagrams illustrating a white stripe appearing in a printed image. FIG. 12A illustrates a result of scanning a print head 906 having a nozzle array length L (the number of nozzles×nozzle pitch) to print a solid image 902 under the condition that a print medium 901 is conveyed by a print medium conveyance amount Fd per scan. As illustrated in FIG. 11, if ejection failure occurs in one nozzle of a nozzle array of the print head 906, white stripes 903, 904, and 905 appear in the solid image in positions corresponding to the nozzle as a result of non-printing of a predetermined dot. That is, in this case, the white stripe periodically appears with the period $\lambda$. As given by Expression (2) below, the white stripe period $\lambda$ is equal to the nozzle array length L, or equal to the print medium conveyance amount Fd per scan.

$$\lambda = L = Fd \qquad (2)$$

When performing the unique portion detecting process, as illustrated in FIG. 12B, the sizes of a division area in X and Y directions are set to Sx and Sy (corresponding to the numbers of pixels), respectively. Then, as will be described in detail below, in the present embodiment, the division size Sy in the conveyance direction is set to be smaller than the white stripe period $\lambda$.

Figure 13A:
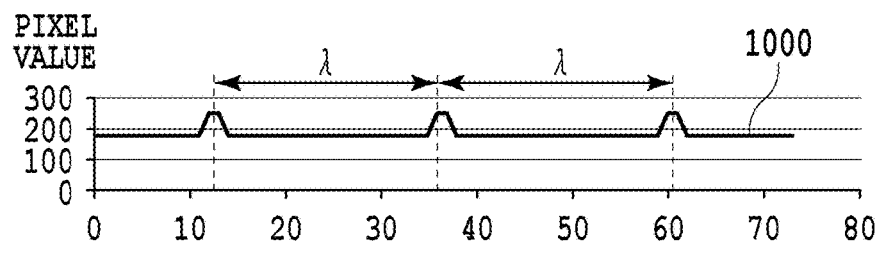
FIGS. 13A to 13C are diagrams illustrating how to detect white stripes appearing in a printed image according to a first embodiment of the present invention.
Figure 13B:
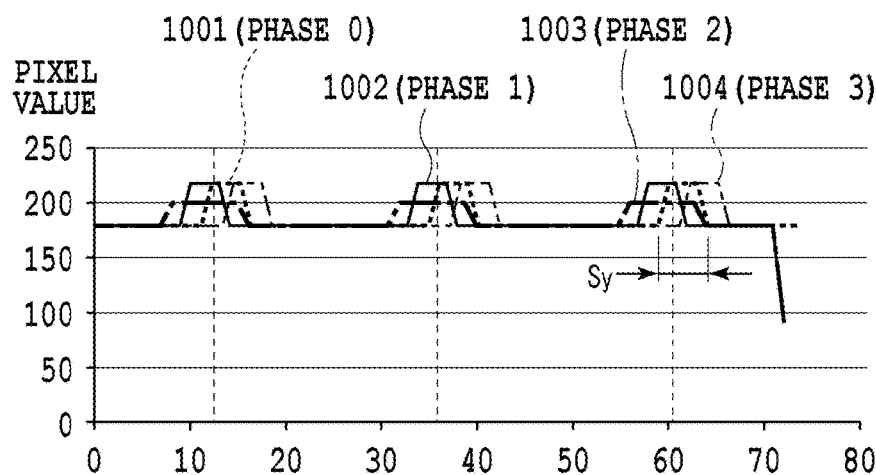
Figure 13C:
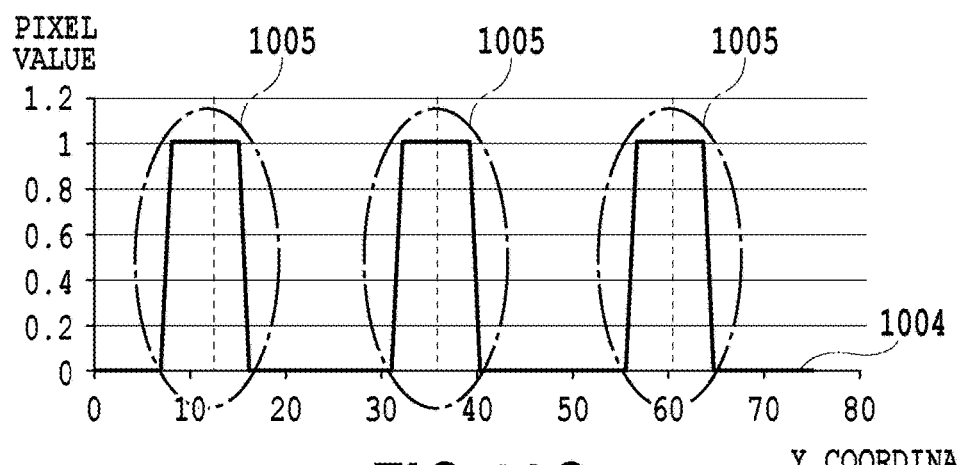

FIGS. 13A to 13C are diagram explaining a detection of white stripes appearing in a printed image according to the first embodiment of the present invention.

FIG. 13A is a graph of which the vertical axis represents pixel value on a line 907 shown in FIG. 12A and the horizontal axis represents a coordinate value on the solid image 902. As illustrated in FIG. 13A, when the white stripes appear, in a pixel value distribution 1000, pixel values (luminance values) in the positions where the white stripes appear are larger than those in the other positions. In addition, the white stripes appear in the Y direction with the period $\lambda$.

FIG. 13B is a diagram illustrating pixel values obtained by the averaging process (S13) performed in respective phases of a division area in the unique portion detecting process described above with FIG. 4. In the example illustrated in FIG. 13B, each of the white stripes appears over several pixels smaller than the size of the division area in the Y direction, which results from, with the use of the division area having the Y direction size Sy of four pixels, performing the averaging process while changing the phase. In the case where the Y direction size Sy of the division area is four pixels, the number of phases of the division area in the Y direction is four. For example, in a phase 0, pixels corresponding to the white stripe are all included in the division area having the size Sy, and as a result of the averaging process, the pixel value in the division area becomes approximately 220, and the pixel value distribution becomes one indicated by a line 1001. Also, in a phase 1 as well where the division area is moved in the Y direction by one pixel, pixels corresponding to the white stripe are included in the moved division area, and as a result of the averaging process, the pixel value becomes approximately 220 which is the same as above. As a result, the pixel value distribution becomes one indicated by a line 1002. In addition, in a phase 2 where the division area is further moved in the Y direction by one pixel, pixels corresponding to the white stripe are equally separately included in the moved division area and a division area adjacent to the moved division area in the Y direction, and as a result of the averaging process, the pixel value in each of the division areas becomes ½ the pixel values in the phases 0 and 1. As a result, the pixel value distribution becomes one indicated by a line 1003. Still in addition, in a phase 3 where the division area is further moved in the Y direction by one pixel, pixels corresponding to the white stripe are not present in the moved division area, but all included in the adjacent division area, and as a result of the averaging process, the pixel value in the division area becomes the same as those in the phases 0 and 1. As a result, the pixel value distribution becomes one indicated by a line 1004.

FIG. 13C illustrates a result (S15 in FIG. 4) of quantizing the averaging process results in the respective phases described above with FIG. 13B and adding quantized values in the respective phases. As illustrated in FIG. 13C, the pixels corresponding to the white stripes and their peripheral pixels (1005) have density different from those in the other positions in an inspection target image, whereby the appearance of the unique portions can be determined.

<Relationship Between Unique Portion Period $\lambda$ and Division Area Size Sy>

As described above, the first embodiment of the present invention is adapted to, in the unique portion detecting process, set the size Sy of a division area in the conveyance direction (Y direction) to be smaller than the period $\lambda$ of a white stripe that may appear in a printed image. Thereby, as described with FIG. 13B regarding pixel values after the averaging process, pixel values of pixels where a white stripe is present and their peripheral pixels can be made different from pixel values of pixels in the other positions.

On the other hand, when the unique portion period λ and the division area size Sy are equal to each other, in any division area, the same number of pixels corresponding to a white stripe is present, and even when changing a phase, the same holds true. As a result, a pixel value after averaging is the same in any division area and in any phase, and therefore a unique portion cannot be distinguished from the other portions.

Figure 14A:
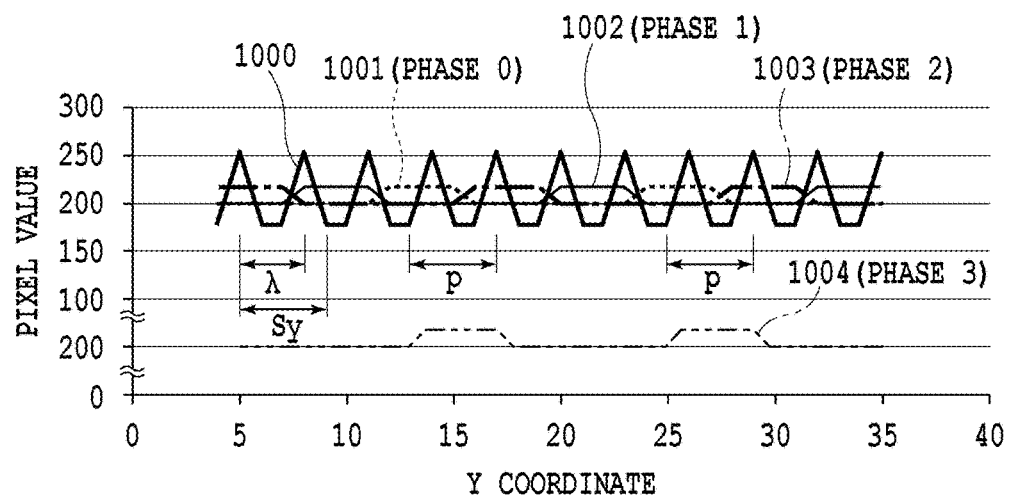
FIGS. 14A and 14B are diagrams illustrating how to detect white stripes appearing in a printed image when a division area size Sy is larger than a period λ.
Figure 14B:
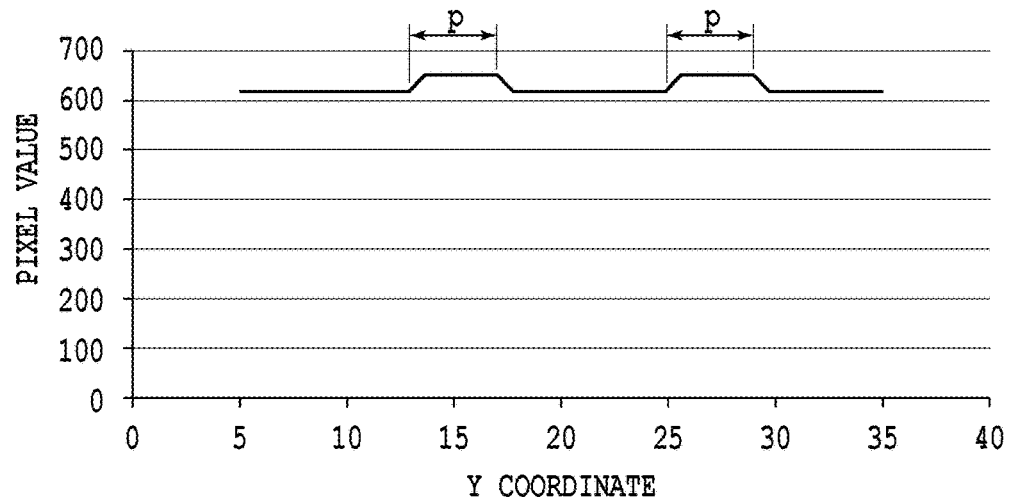

Further, in a case that the division area size Sy is larger than the unique portion period λ, the explanation is a follows. FIGS. 14A and 14B are diagrams illustrating a detection of white stripes appearing in a printed image when the division area size Sy is larger than the period λ. In the example illustrated in FIG. 14A, when the white stripes appear in the printed image, a corresponding pixel value distribution 1000 is such that a pixel value of a pixel corresponding to each of the white stripes is approximately 250, and larger than a pixel value (approximately 180) of a pixel where no white stripe is present. Also, the period λ of a white stripe is three pixels. In response to this, the Y direction size Sy of a division area used for a white stripe detecting process is set to four pixels.

In the case where the Y direction size Sy of a division area is four pixels, the number of phases of the division area in the Y direction is four. In a phase 0, when two white stripe pixels are included in the division area having the size Sy, as a result of the averaging process, a pixel value in the division area becomes approximately 215, and when one white stripe pixel is included in the division area, as a result of the averaging process, a pixel value in the division area becomes approximately 200, resulting in a pixel value distribution indicated by a line 1001. The same holds true for phases 1 to 3, and by sequentially shifting a phase by one pixel rightward in the diagram, the same pixel value distributions 1002 to 1004 as the pixel value distribution 1001 can be obtained. Note that a pixel value distribution 1004 in a phase 3 is illustrated separately from the pixel value distributions in the other phases for simplicity of description.

FIG. 14B illustrates a result of adding averaging process results performed in the respective phases described above with FIG. 14A. As can be seen from FIG. 14B, there are areas P where pixel values in the addition result are larger than those in the other division areas. More specifically, the areas P result from directly adding an addition value in the averaging process result in the phase 3 to an addition result of the averaging process results in the phases 0 to 2, which is zero in total in the Y direction. As described, in this example, there are the areas P where the addition result is different from those in the other division areas, and two positions where white stripes appear are present in each of the areas P. For this reason, it can be estimated that the white stripes are present in the areas P, respectively. However, the appearance positions of the two white stripes cannot be individually specified and detected.

Figure 15:
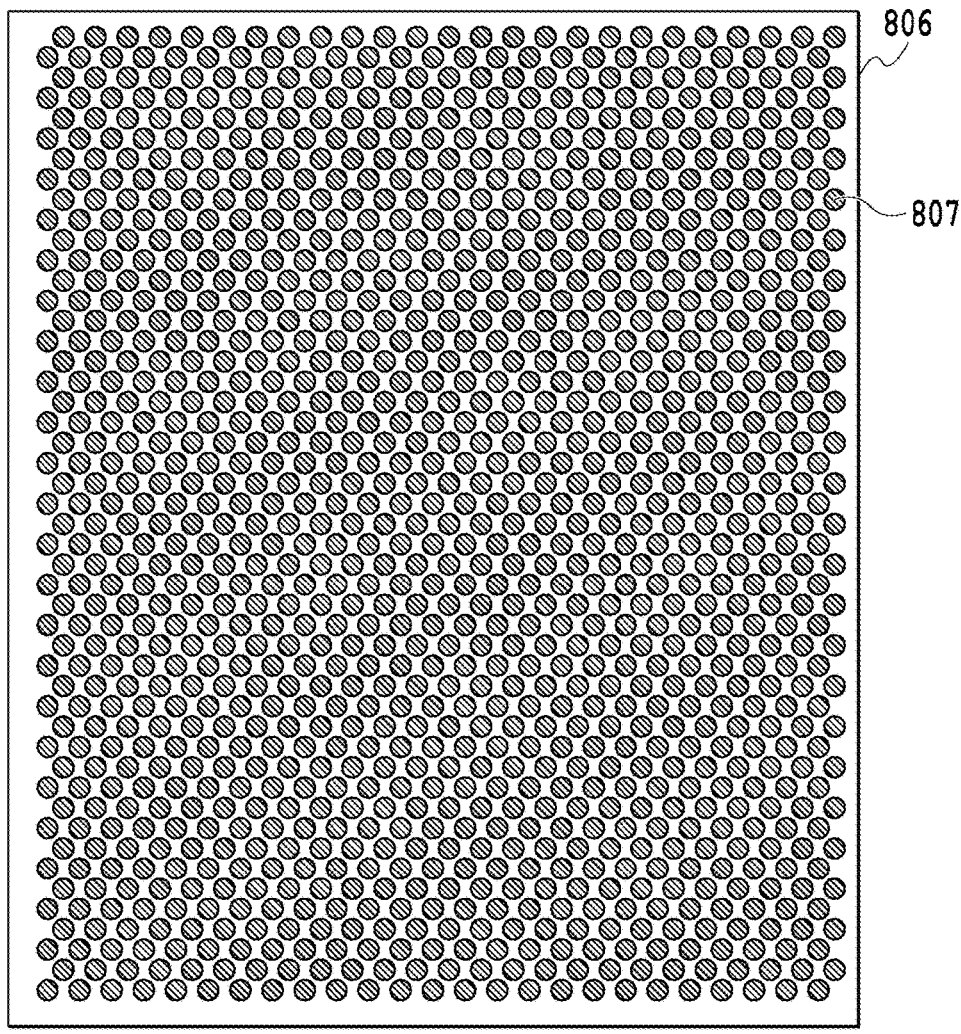
FIG. 15 is a diagram illustrating another example of an inspection printed image according to one embodiment of the present invention.

Note that in the above-described unique portion detection, a printed image as an inspection target is set as a so-called solid image; however, a printed image for inspection is of course not limited to such an example. For, example, in the case of a solid image, ejection failure may be unlikely to appear due to ink bleed on a print medium. In such a case, as illustrated in FIG. 15, a pattern 806 where ink dots are thinned can be used. That is, Reference numeral 807 represents ink dots ejected from nozzles, and when some of the dots are missing due to ejection failure, in order to make the missing dots more apparent, the preliminarily thinned pattern is prepared.

In the printing apparatus described above according to the present embodiment, the periodicity of a unique portion can be determined by the characteristics of the printing apparatus, and the above-described white stripe can be identified on the basis of the characteristics of the print head of the printing apparatus or a method for conveying a print medium. In the case of the solid image 902 illustrated in FIG. 12B, as described above, the size Sy of a division area in the print medium conveyance direction can be determined so as to meet Expression (3) below. Also, the size Sy of the division area in the direction orthogonal to the print medium conveyance direction can be set to any value.

$$Sy<L \text{ or } Sy<Fd \qquad (3)$$

Also, when using a filtering process for inspection as well, division sizes (GSx, GSy) are determined as follows. That is, the division size GSy in the print medium conveyance direction is determined so as to meet Expression (4) below, and the division size GSx in the direction orthogonal to the print medium conveyance direction is set to any value.

$$GSy<\lambda \qquad (4)$$

FIGS. 16A to 16C are diagrams illustrating other examples of a method for determining the periodicity of a unique portion according to one embodiment of the present invention. FIGS. 16A and 16B illustrate states where white stripes 1103 to 1108 appear in a solid image 1102 due to the effect of an ejection failure nozzle of a print head 109 under the conditions that a nozzle array length is L and a print medium conveyance amount is Fd2. That is, each of the diagrams illustrates the white stripes that may appear when a serial type printing apparatus performs so-called multipass printing. In the multipass printing, an image is formed by scanning a predetermined area on a print medium several times using the same nozzle group or different nozzle groups obtained by dividing a nozzle array of a print head. Given that the number of scans is defined as a pass number P, the print medium conveyance amount Fd2 can be expressed by Expression (5) below. Note that Fd2 is assumed to be constantly fixed during a print action.

$$Fd2=L/P \qquad (5)$$

Accordingly, in order to detect the white stripes illustrated in FIG. 16A, the size Sy of a division area in the print medium conveyance direction is determined so as to meet Expression (6) below.

$$Sy<L/P \qquad (6)$$

Also, when using a filtering process for inspection as well, division sizes (GSx, GSy) are set as follows. That is, the division size GSy in the print medium conveyance direction is set so as to meet Expression (7) below, and the division size GSx in the direction orthogonal to the print medium conveyance direction is set to any value.

$$GSy<L/P \qquad (7)$$

The example illustrated in FIG. 16A or 16B is one where the print medium conveyance amount Fd is constant from the start to end of image printing. On the other hand, as illustrated in FIG. 16C, in the middle of a printed image, a blank area is present, and when print medium conveyance (conveyance amount Fdw) corresponding to the blank area interposes, the coordinates of a division area are reset before the print medium conveyance corresponding to the blank area.

As another example of a unique portion having periodicity, there is a stripe or density unevenness caused by a print medium conveyance error in a printing apparatus.

Figure 17:
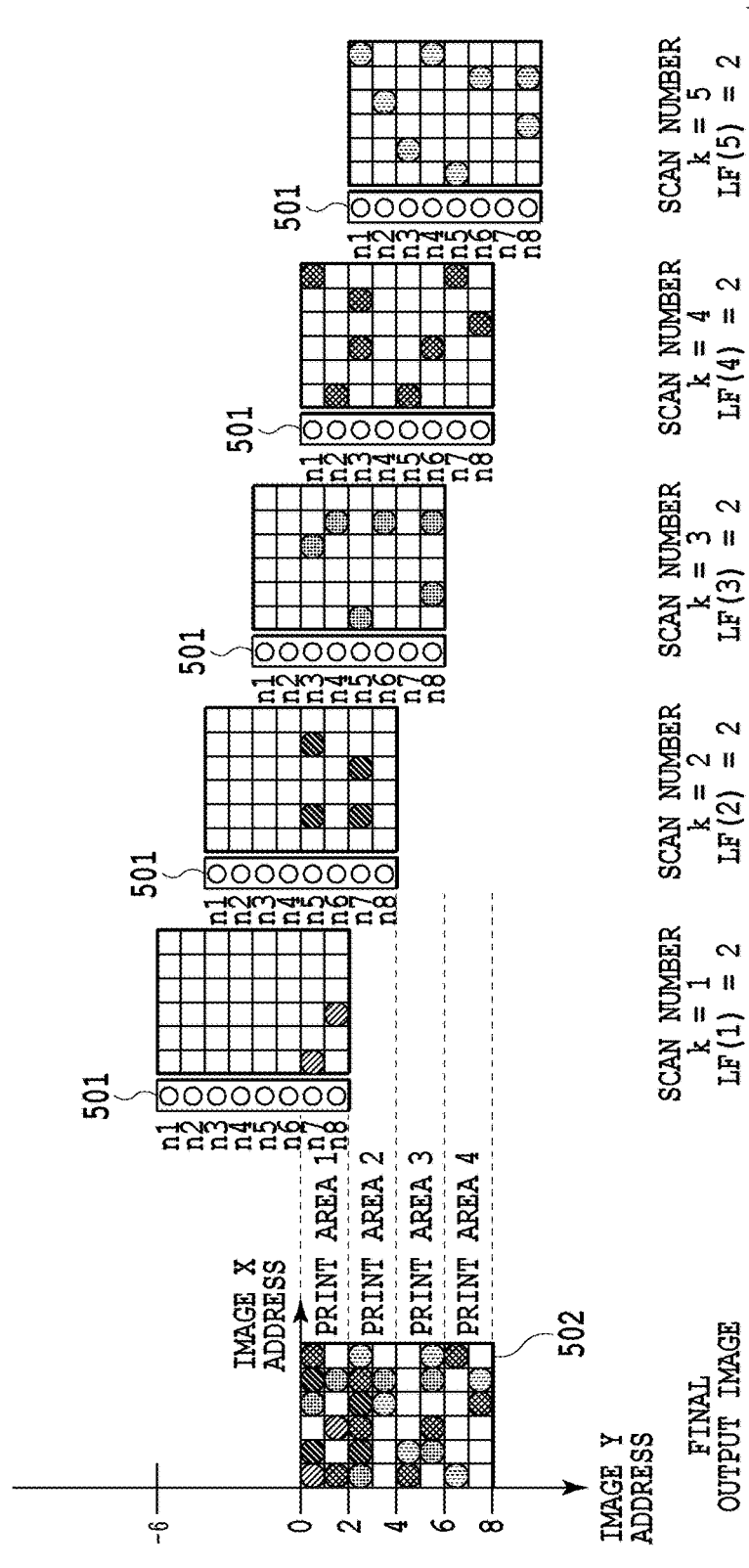
FIG. 17 is a diagram schematically illustrating multipass printing.

FIG. 17 is a diagram schematically illustrating multipass printing. In an example of the multipass printing illustrated in the diagram, a print head 1301 scans a predetermined area five times to thereby obtain a final image 1302. Specifically, by conveying a print medium by two addresses per scan along an image Y address, the image is formed on the print medium. When performing multipass printing as described, a print medium is conveyed step by step by predetermined addresses; however, a deviation from a predetermined conveyance amount occurs due to roller attachment accuracy (tilt, eccentricity). As a result, as illustrated in FIG. 18, density unevennesses (1404) may appear in an image.

The sizes S (Sx, Sy) of a division area at the time of inspecting unique portions with an image 1402 where such density unevennesses may appear as an input image are set in accordance with Expression (8) below. In Expression (8), $\lambda f$ represents a value that can be uniquely defined by the conveyance amount of a print medium 1401.

$$Sy < \lambda f \quad (8)$$

Figure 18:
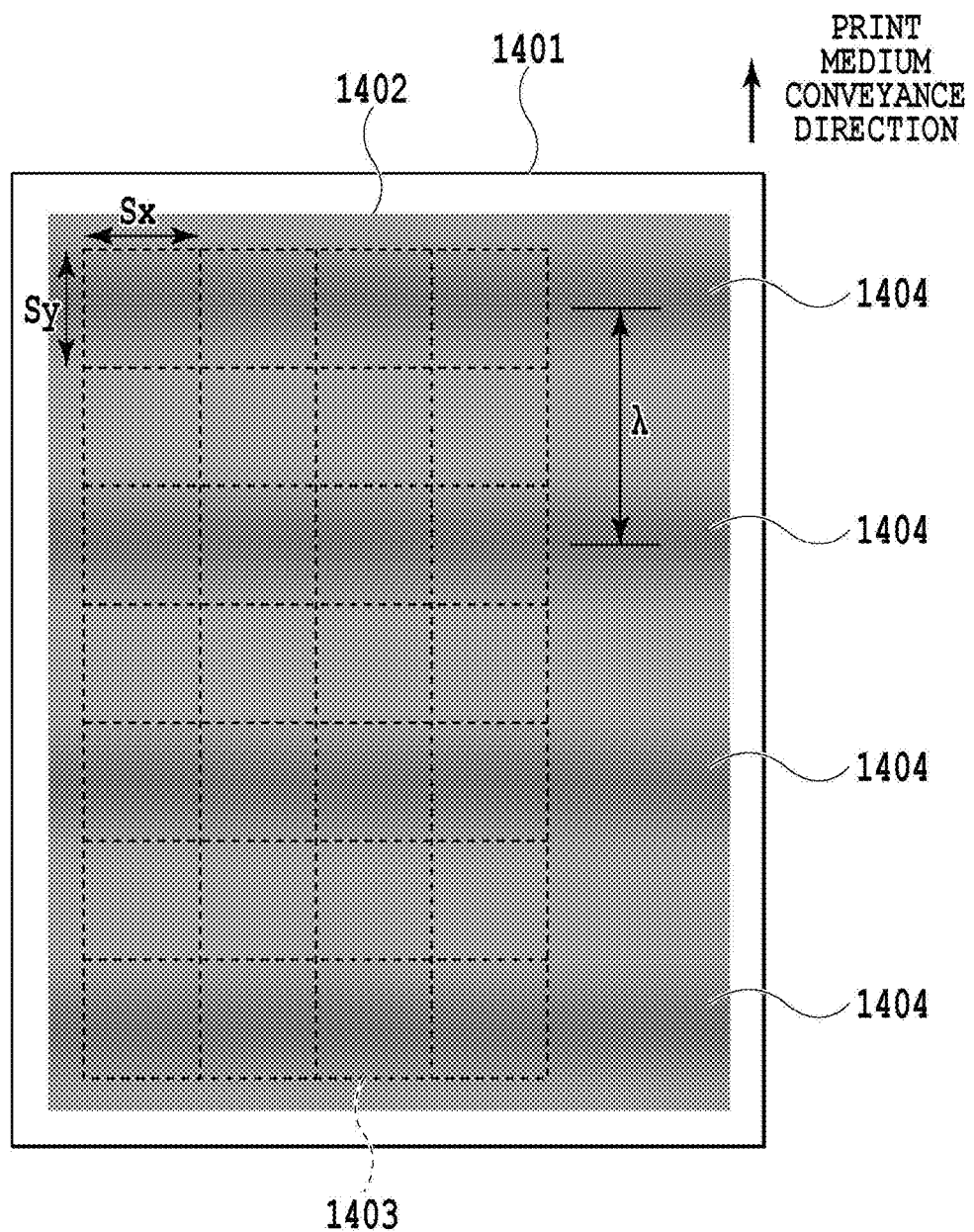
FIG. 18 is a diagram illustrating density unevennesses that are caused by a print medium conveyance error and may appear in a printed image.

In FIG. 18, the sizes S of the division area obtained by dividing an area 1403 can be set as follows. That is, the size Sy in the print medium conveyance direction is set in accordance with Expression (8) above. On the other hand, the size Sx in the direction orthogonal to the conveyance direction can be set to any value.

Also, when using a Gaussian filter as well, division sizes (GSx, GSy) are set as follows. That is, the division size GSy in the print medium conveyance direction is set so as to meet Expression (9) below. The division size GSx in the direction orthogonal to the print medium conveyance direction is set to any value.

$$GSy < \lambda f \quad (9)$$

Further, as an example of a unique portion having other periodicity, there is a density unevenness caused by scanning drive of a print head. In the serial type printing apparatus of the present embodiment, when a carriage mounted with the print head moves over a print medium, a vibration may occur at joining parts between belts for moving the carriage. Also, a driving motor for moving the carriage may cause a periodic vibration. Such vibrations cause a variation in landing position of ink ejected from the print head, and as a result, density unevenness may occur.

Figure 19B:
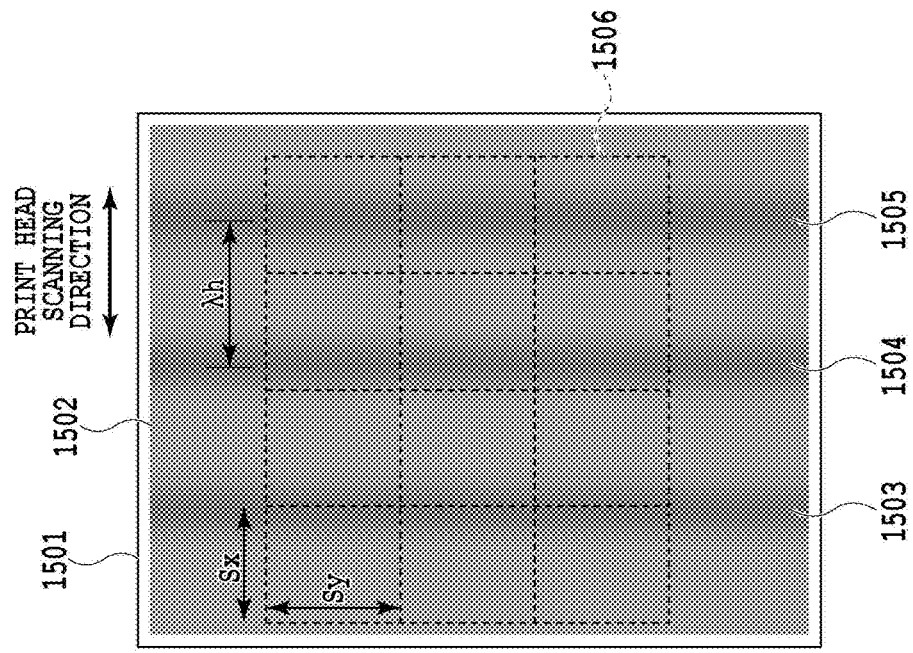
FIGS. 19A and 19B are diagrams illustrating density unevennesses caused by driving of a carriage and the sizes of a division area for detecting the density unevennesses according to one embodiment of the present invention.
Figure 19A:
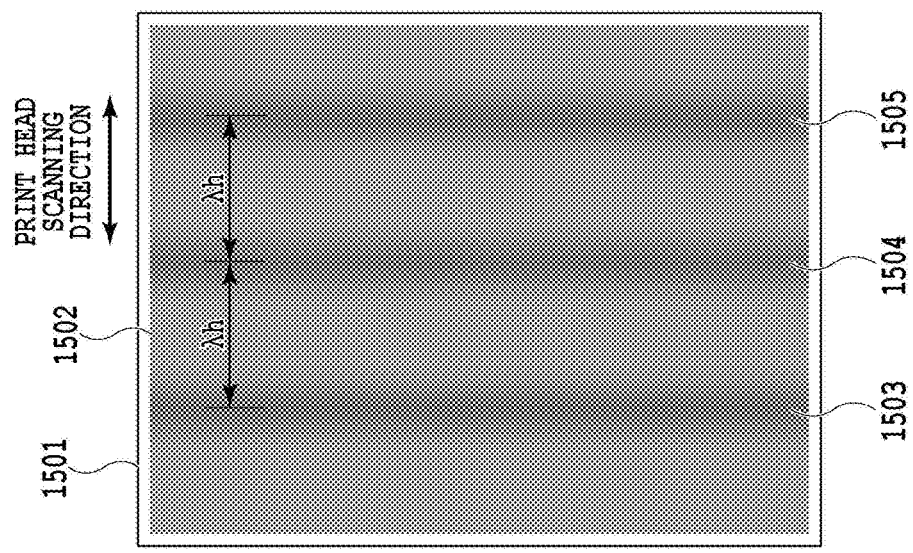

FIGS. 19A and 19B are diagrams illustrating density unevenness caused by driving of the carriage and the sizes of a division area for detecting the density unevenness. As illustrated in FIG. 19A, sometimes, the density unevennesses 1503, 1504, and 1505 appear in an image with a period $\lambda h$ due to driving for print head scanning.

In response to this, division sizes S (Sx, Sy) at the time of inspecting unique portions with an image 1502 where the density unevennesses appear as an input image are set in accordance with Expression (10) below. In doing so, as compared with the case of detection using a division size not meeting Expression (10), the density unevennesses can be accurately detected. A period $\lambda h$ can be determined by the driving characteristics of the print head of the printing apparatus such as the interval between joining parts of belts for driving the carriage mounted with the print head, a motor driving period, and an ejection driving period of the print head.

$$Sx < \lambda h \quad (10)$$

As illustrated in FIG. 19B, division areas 1506 are obtained by dividing the solid image 1502 by the sizes (Sy, Sx). As illustrated in the diagram, Sx is the size of each of the division areas in the print head scanning direction, which is determined in accordance with Expression (10) above, and Sy is the size of that division area in the direction orthogonal to the scanning direction and can be set to any value.

Also, when using a Gaussian filter as well, division sizes (GSx, GSy) are set as follows. That is, the division size GSx in the print head scanning direction is set so as to meet Expression (11) below. The division size GSy in the direction orthogonal to the print head scanning direction can be set to any value.

$$GSy < \lambda h \quad (11)$$

In the above example, the density unevennesses are cited as unique portions caused by the driving characteristics of the print head; however, depending on the type of ink ejected from the print head, a periodic unique portion may be reproduced as gloss unevennesses. In such a case, by setting glossiness values as pixel values of an inspection target image inputted to the inspection part 218, the unique portions can be detected in the same manner.

Second Embodiment

Figure 20A:
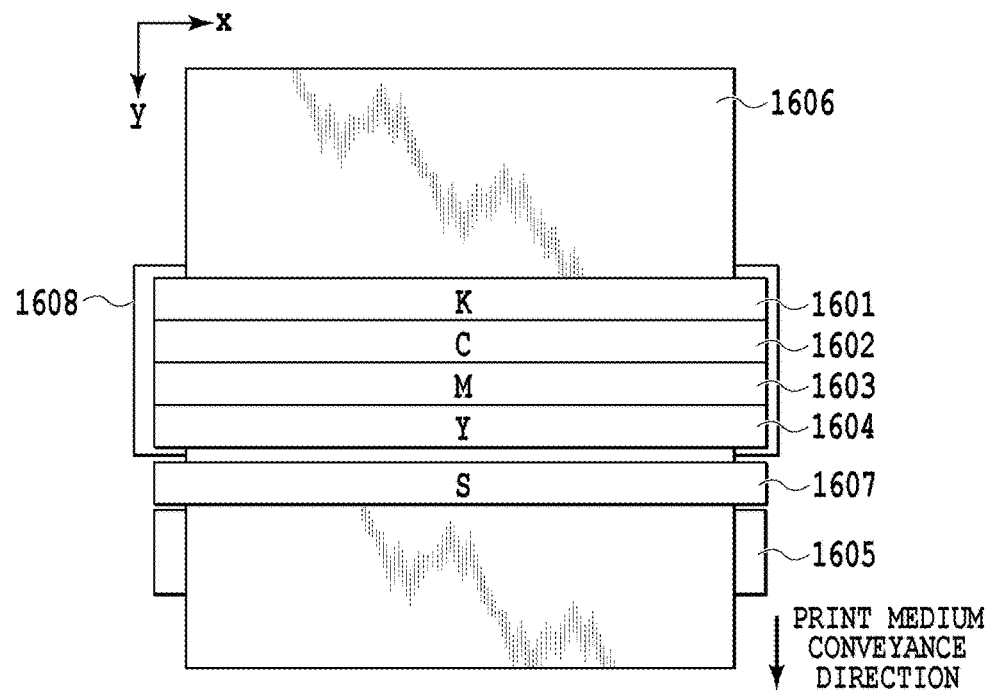
FIGS. 20A and 20B are diagrams illustrating a full-line type inkjet printer according to a second embodiment of the present invention, and the nozzle arrangement of a print head, respectively.
Figure 20B:
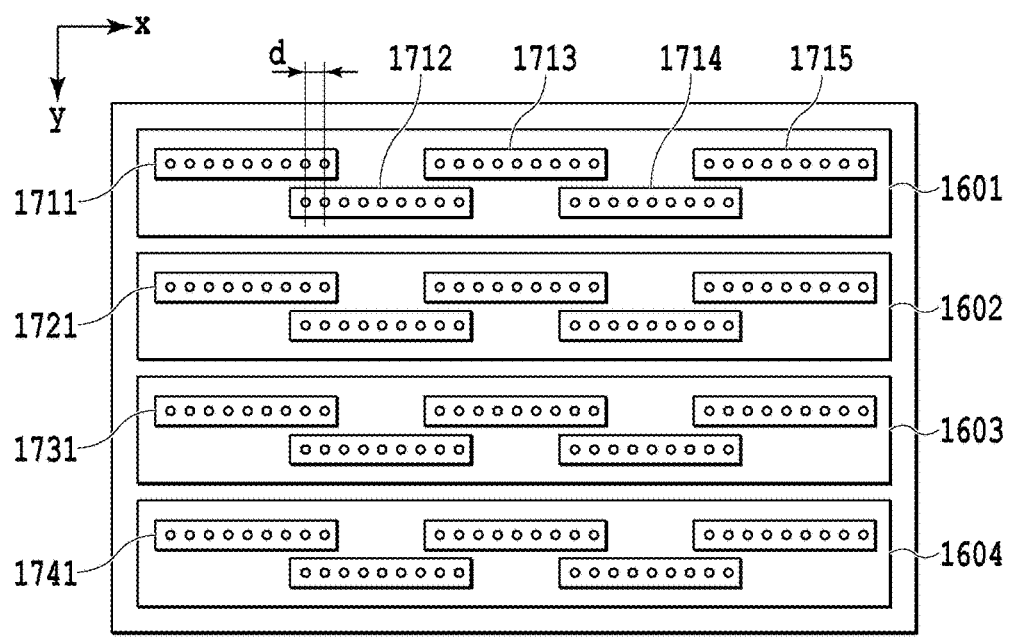

A second embodiment of the present invention relates to a full-line type printing apparatus. FIGS. 20A and 20B are diagrams illustrating a full-line type inkjet printer according to the second embodiment of the present invention, and print head nozzle arrangement, respectively. In FIG. 20A, print heads 1601 to 1604 are ones each in which nozzles are arrayed (in an X direction of the diagram) over the width of a print medium 1606 to be conveyed. This makes it possible to eject inks onto the print medium 1606 in conveyance with respect to the print heads, and perform printing. The print heads 1601 to 1604 are ones adapted to eject black (K), cyan (C), magenta (M), and yellow (Y) inks, respectively. Also, the print heads 1601 to 1604 adapted to eject the multiple types of inks are arrayed in a Y direction of the diagram corresponding to a conveyance direction of the print medium.

FIG. 20B illustrates the nozzle arrays of the print heads 1601 to 1604. As illustrated in the diagram, in the print head 1601, multiple ejection boards 1711 to 1715 each having a predetermined number of arrayed nozzles are arranged in a state of overlapping in a nozzle array direction. In any of the other print heads 1602 to 1604, ejection boards are also arranged along the nozzle array direction. Also, ejection boards (1711, 1721, 1731, and 1741) in corresponding positions of the respective print heads are arranged along the print medium conveyance direction intersecting with the nozzle array direction.

Referring to FIG. 20A again, a platen 1608 is provided in a position facing to a surface (ejection surface) in which ejection ports of the print heads 1601 to 1604 are formed, and by supporting the back surface of the print medium 1606, the distance between the front surface of the print medium 1606 and the ejection surface is kept at a constant distance. A conveyance roller 1605 (and other unillustrated rollers) is rotated by driving force of a motor (not illustrated), and thereby the print medium 1606 conveyed onto the platen 1608 and printed is conveyed in the Y direction of the diagram. During the conveyance of the print medium 1606, from multiple nozzles of the print heads 1601 to 1604, an ejecting action is performed in accordance with print data at a frequency corresponding to a conveyance speed of the print medium 1601. In doing so, dots of the respective colors are formed at a predetermined resolution in accordance with the print data to print an image on the print medium 1606.

In a position on the downstream side of the print heads 1601 to 1604 in the conveyance direction, a scanner 1607 is provided. The scanner 1607 in which reading elements are arrayed in the X direction at predetermined pitches is used for image reading such as reading an image printed on a print medium when performing an inspection process, and outputs RGB data as the reading result.

Note that the present embodiment uses an example where a print head is provided for each of the ink colors; however, it is also possible to use a form adapted to eject inks of multiple colors from one print head. Further, it is also possible to use a form adapted to, on one ejection board, array nozzle arrays respectively corresponding to inks of multiple colors.

Figures 21A, 21B:
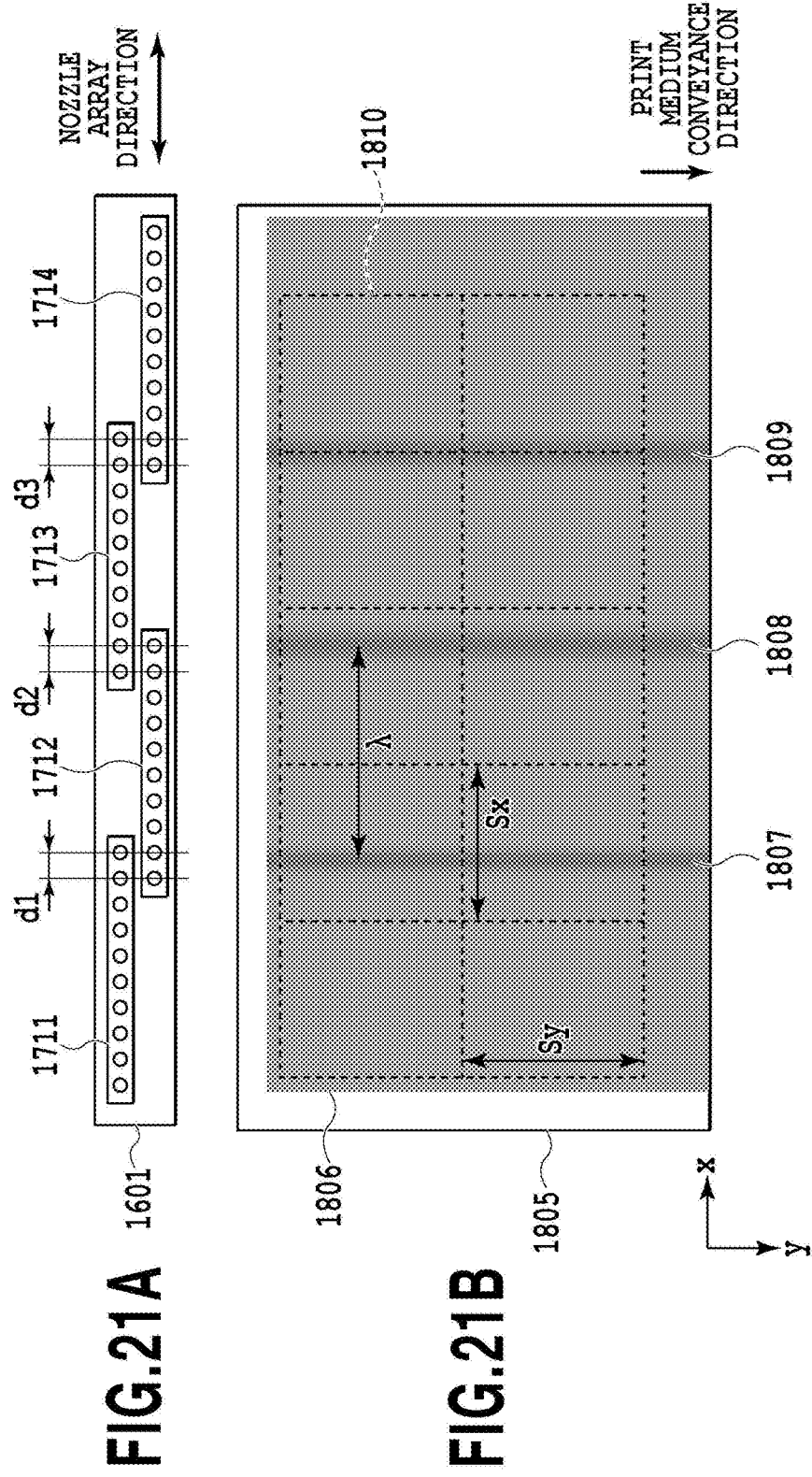
FIGS. 21A and 21B are diagrams illustrating density unevennesses, which may appear in positions corresponding to overlap positions, and the sizes of a division area for detecting the density unevennesses according to the second embodiment of the present invention.

In the above-described printing apparatus of the present embodiment, in a printed image, density unevennesses may appear in positions corresponding to nozzle array overlap parts. FIGS. 21A and 21B are diagrams illustrating density unevennesses, which may appear in positions corresponding to the overlap positions, and the sizes of a division area for detecting the density unevennesses. As illustrated in FIG. 21A, since the multiple ejection boards 1711 to 1714 are arranged in the state of overlapping in the nozzle array direction, in the positions corresponding to the overlap parts, the density unevennesses 1807, 1808, and 1809 caused by the attachment accuracy of the ejection boards or the like may appear with a period λ.

The sizes S (Sx, Sy) of the division area at the time of inspecting unique portions with an image having such periodic density unevennesses as an inspection target image are set in accordance with Expression (12) below. In the expression, Ci (i is an integer not less than 1 and not more than the number of inks) is the distance between ejection boards, and when the distance between ejection boards is different for each color, the distance Ci between ejection boards for a color most affecting unique portions is set in Expression (12).

$$Sx < Ci \qquad (12)$$

Thereby, as compared with the case of detection using a division area size not meeting Expression (12), accurate detection can be achieved. As illustrated in FIG. 21B, when inspecting a solid image 1806 using a division area 1810 of which the division sizes S (Sy, Sx) are set, Sx is the size in the nozzle array direction of the print head, and determined in accordance with Expression (12) above. Also, Sy is the size in the Y direction, and can be set to any value.

Also, when using a Gaussian filter as well, the sizes GS (GSx, GSy) of a division area are set as follows. That is, the size GSx in the nozzle array direction of the print head is set so as to meet Expression (13) below. The division size GSy in the print medium conveyance direction is set to any value.

$$GSy < Ci \qquad (13)$$

Even when using a Gaussian filtering process, as compared with the case of detection using a division area size not meeting Expression (13), accurate detection can be achieved.

Third Embodiment

A third embodiment of the present invention relate to a process adapted to inspect texture that occurs when using a dither process as a quantization process for determining dot arrangement at the time of printing. In a printing apparatus, in order to determine dot arrangement on a print medium, a quantization process adapted to convert input image data into a value equal to or smaller than a gradation number smaller than an input gradation number, i.e., to a binary value corresponding to a dot print signal or a larger value is performed. The present embodiment is adapted to, as a unique portion, detect a texture that may appear in a printed image when using the dither pattern as the quantization process, and depending on the period of the texture, appropriately determine the sizes of a division area used for inspection.

FIGS. 22A to 22C are diagram illustrating textures caused by the dither process and a detection of the textures according to the third embodiment of the present invention. FIG. 22A illustrates a threshold value matrix used for the dither process, and the example illustrated in the diagram represents the matrix in which threshold values 1901 are arranged in 512×512 pixels, respectively. Multivalued input data and a threshold value of a corresponding pixel are compared to perform binarization using this dither matrix. Note that the quantization process in the present embodiment is performed using the image processing accelerator 216 or the CPU 211/201 illustrated in FIG. 2.

As illustrated in FIG. 22B, when in the printing apparatus, for example, a variation in ink landing position occurs, and the variation appears as dot sparseness or denseness within an area 1903 having the threshold value matrix size 512×512 pixels, a change in density due to the sparseness or denseness are repeated by the threshold value matrix size. As a result, in a printed image, the repetitive change in density appears as a periodic texture.

When detecting the periodic texture in the inspection part in the present embodiment, the sizes S (Sx, Sy) of a division area used for inspection are set so as to meet Expression (14) below. Note that in Expression (14), M and N represent the sizes of the threshold value matrix in X and Y direction respectively, and are integers equal to or more than 1.

$$Sx < M \text{ and } Sy < N \qquad (14)$$

M and N in Expression (14) correspond to the repetition period of the threshold value matrix. In doing so, in the present embodiment, as illustrated in FIG. 22C, the periodicity λxy of a unique portion determinable by an image processing method as the characteristics of the printing apparatus is used to determine the sizes of the division area used for the inspection.

When using a Gaussian filter as well, division sizes GS (GSx, GSy) are set so as to meet Expression (15) below using the sizes M and N of the threshold value matrix.

$$GSx < M \text{ and } GSy < N \qquad (15)$$

As described, by setting division area sizes used for inspection with respect to a unique portion that has periodicity and appears in the printing apparatus due to the image processing related to the characteristics of the printing apparatus, failure detection accuracy can be improved.

Fourth Embodiment

A fourth embodiment of the present invention is adapted to, as a unique portion, detect a density unevenness that may appear due to the deformation of a print medium in a printing apparatus.

Figure 23A:
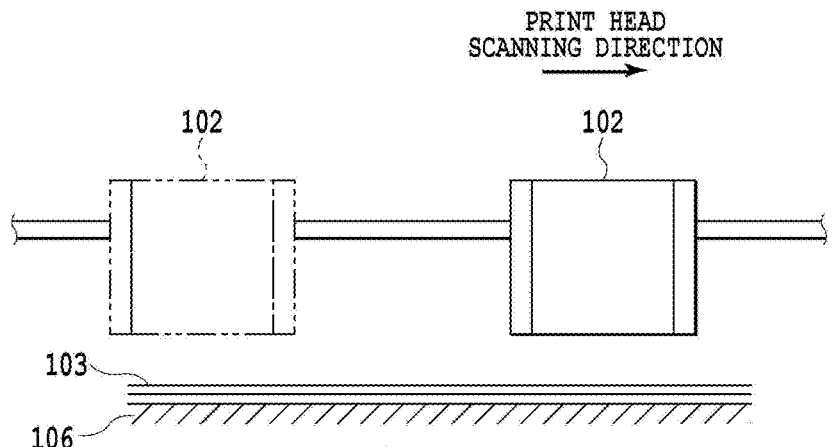
FIGS. 23A to 23C are diagrams illustrating density unevennesses caused by the deformation of a print medium and how to detect the density unevennesses according to a fourth embodiment of the present invention.
Figure 23B:
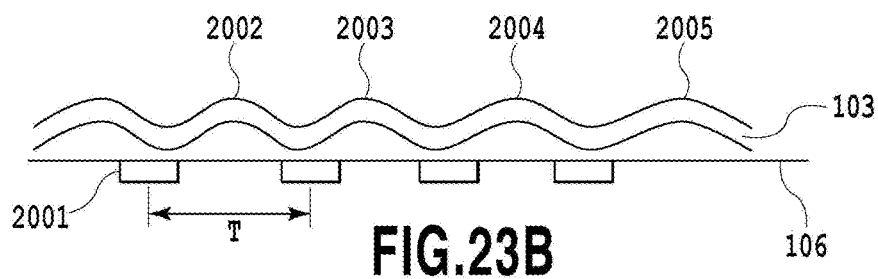
Figure 23C:
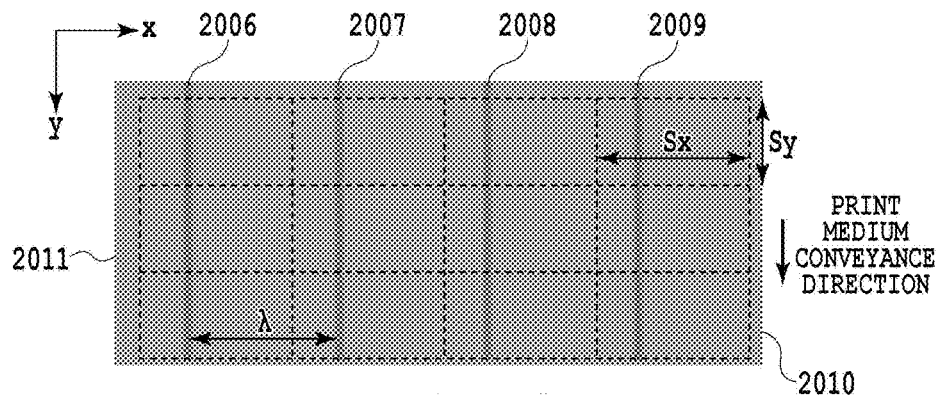

FIGS. 23A to 23C are diagrams illustrating density unevennesses caused by the deformation of a print medium and a detection of the density unevennesses according to the fourth embodiment of the present invention. As illustrated in FIG. 23A, the platen 106 supports the back surface of the print medium 103, and thereby keeps the distance d between the front surface of the print medium 103 and the ejection surface at a constant distance. However, depending on the characteristics of the print medium or the amount of ink to be ejected, as illustrated in FIG. 23B, cockling causing the print medium 103 to cockle may occur. When the cockling occurs, convex portions (2002 to 2005 in FIG. 23B) of the print medium cause variations in landing position of ink ejected from the print head. As a result, density unevenness becomes likely to occur with a convex portion period. The convex portions of the print medium often correspond to structural joining parts 2001 of the platen of the printing apparatus.

As illustrated in FIG. 23C, given that the distance between adjacent joining parts of the platen is represented by T, when the inspection part 218 inspects the density unevennesses 2006 to 2009 that are caused by the cockling and appear in a printed image 2011, the sizes S (Sx, Sy) of a division area 2010 are set so as to meet Expression (16) below.

$$Sx<T \tag{16}$$

Thereby, as compared with the case of detection using a division size not meeting Expression (16), accurate detection can be achieved. As illustrated in FIG. 23C, Sx is the size of the division area in a direction in which the joining parts of the platen are periodically arranged, and Sy is the size of the division area in a direction orthogonal to that direction and can be set to any value.

Also, when using a Gaussian filter as well, division sizes GS (GSx, GSy) are set as follows. That is, the division size GSx in the direction in which the joining parts of the platen are periodically arranged is set so as to meet Expression (17) below. The division size GSy in the print medium conveyance direction can be set to any value.

$$GSx<T \tag{17}$$

As described, by setting division area sizes used for inspection with respect to a unique portion having periodicity and appearing in the printing apparatus due to the image processing related to the characteristics of the printing apparatus, unique portion detection accuracy can be improved.

Other Embodiments

In the above-described embodiments, the inspection part 218 for inspecting a unique portion is included in the printer 100. However, only the inspection part 218 may be configured as a separate circuit, or may be incorporated in another apparatus such as the host apparatus.

Also, it goes without saying that the present invention can also be achieved by supplying a print medium in which software program codes of the processes related to the above-described embodiments of the present invention are printed to a system or an apparatus, and making a computer (or a CPU or an MPU) of the system or the apparatus read and perform the program codes stored in a storage medium. In this case, the program codes themselves read from the storage medium realize the functions of the above-described embodiments, and the print medium storing the program codes constitutes the present invention.

In addition, it goes without saying that by executing the program codes read by the computer, the functions of the above-described embodiments are realized, and in addition, the case where on the basis of instructions of the program codes, an operating system (OS) or the like running on the computer performs part or all of the processes, and the processes realize the functions of the above-described embodiments is also included in the present invention.

Further, it goes without saying that the case where the program codes read from the storage medium are written in a memory of a function expansion board inserted into the computer or of a function expansion unit connected to the computer, then on the basis of the instructions of the program codes, a CPU or the like of the function expansion board or function expansion unit actually performs part or all of the processes, and the processes realizes the functions of the above-described embodiments is also included in the present invention.

Still further, the printing apparatus in the embodiments is of course not limited to an apparatus of an inkjet type. Unevenness or the like caused by print medium conveyance due to roller attachment accuracy or the like also occurs in an electrophotographic printing apparatus, and therefore failure can be detected using a division size determinable by the characteristics of the printing apparatus. The same holds true for a printing apparatus of another print type such as a sublimation type.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-132733, filed Jul. 1, 2015, which is hereby incorporated by reference wherein in its entirety.

What is claimed is:

1. An image processing apparatus that performs a process of detecting a unique portion that occurs periodically in an inspection target image, the apparatus comprising:
    a dividing unit configured to divide a part area of the inspection target image into a plurality of division areas each having a predetermined size;
    an averaging unit configured to change a phase of each of the plurality of division areas in the part area and to average pixel values in each of the plurality of division areas in each of changed phases;
    an addition unit configured to add averaged values in each of the plurality of division areas in each of changed phases, in relation to pixel positions in the inspection target image; and
    a setting unit configured to, with respect to a period λ with which the unique portion of a detection target appears, set a size S of each of the plurality of division areas in a direction in which the unique portion may appear with the period λ, so as to meet S<λ.

2. An image processing apparatus that performs a process of detecting a unique portion that occurs periodically in an inspection target image, the apparatus comprising:
    a filtering unit configured to perform a filtering process that averages pixel values in pixels consisting of a pixel of a part area of the inspection target image and peripheral pixels of the pixel of the part area of the inspection target image, which are determined according to a size of a filter, for each of pixels of the part area of the inspection target image;
    an addition unit configured to add values resulting from the filtering process for each of pixels of the part area of the inspection target image in relation to pixel positions in the inspection target image; and
    a setting unit configured to, with respect to a period λ with which the unique portion of a detection target appears, set a size S in the filtering process in a direction in which the unique portion may appear with the period $\lambda$, so as to meet $S<\lambda$.

3. The image processing apparatus according to claim 1, wherein the period $\lambda$ corresponds to a length of a nozzle array in a print head used for printing the inspection target image.

4. The image processing apparatus according to claim 1, wherein the period $\lambda$ corresponds to a conveyance amount of one time conveyance of a print medium in printing the inspection target image.

5. The image processing apparatus according to claim 1, wherein the period $\lambda$ corresponds to a period caused due to driving for scanning a print head in printing the inspection target image.

6. The image processing apparatus according to claim 1, wherein the period $\lambda$ corresponds to a distance between respective overlap parts at which respective adjacent nozzle arrays overlap with each other in a print head used for printing the inspection target image.

7. The image processing apparatus according to claim 1, wherein a quantization process is performed for printing the inspection target image using a dither process, and
the period $\lambda$ corresponds to a size of a dither matrix used in the dither process.

8. The image processing apparatus according to claim 1, wherein the period $\lambda$ is determined based on a structure of a platen and a characteristic of a print medium.

9. The image processing apparatus according to claim 1, further comprising a printing unit configured to perform printing on a print medium by using a print head.

10. The image processing apparatus according to claim 2, further comprising a printing unit configured to perform printing on a print medium by using a print head.

11. An image processing method for performing a process of detecting a unique portion that occurs periodically in an inspection target image, the method comprising:
a dividing step of dividing a part area of the inspection target image into a plurality of division areas each having a predetermined size;
an averaging step of changing a phase of each of the plurality of division areas in the part area and averaging pixel values in each of the plurality of division areas in each of changed phases;
an addition step of adding averaged values in each of the plurality of division areas in each of changed phases, in relation to pixel positions in the inspection target image; and
a setting step of, with respect to a period $\lambda$ with which the unique portion of a detection target appears, setting a size S of each of the plurality of division areas in a direction in which the unique portion may appear with the period $\lambda$, so as to meet $S<\lambda$.

12. An image processing method for performing a process of detecting a unique portion that occurs periodically in an inspection target image, the method comprising:
a filtering step of performing a filtering process that averages pixel values in pixels consisting of a pixel of a part area of the inspection target image and peripheral pixels of the pixel of the part area of the inspection target image, which are determined according to a size of a filter, for each of pixels of the part area of the inspection target image;
an addition step of adding values resulting from the filtering process for each of pixels of the part area of the inspection target image in relation to pixel positions in the inspection target image; and
a setting step of, with respect to a period $\lambda$ with which the unique portion of a detection target appears, setting a size S in the filtering process in a direction in which the unique portion may appear with the period $\lambda$, so as to meet $S<\lambda$.

13. The image processing method according to claim 11, wherein the period $\lambda$ corresponds to a length of a nozzle array in a print head used for printing the inspection target image.

14. The image processing method according to claim 11, wherein the period $\lambda$ corresponds to a conveyance amount of one time conveyance of a print medium in printing the inspection target image.

15. The image processing method according to claim 11, wherein the period $\lambda$ corresponds to a period caused due to driving for scanning a print head in printing the inspection target image.

16. The image processing method according to claim 11, wherein the period $\lambda$ corresponds to a distance between respective overlap parts at which respective adjacent nozzle arrays overlap with each other in a print head used for printing the inspection target image.

17. The image processing method according to claim 11, wherein a quantization process is performed for printing the inspection target image using a dither process, and
the period $\lambda$ corresponds to a size of a dither matrix used in the dither process.

18. The image processing method according to claim 11, wherein the period $\lambda$ is determined based on a structure of a platen and a characteristic of a print medium.

\* \* \* \* \*